(12) United States Patent
Forutanpour et al.

(10) Patent No.: US 11,803,954 B2
(45) Date of Patent: *Oct. 31, 2023

(54) METHODS AND SYSTEMS FOR DETECTING CRACKS IN ILLUMINATED ELECTRONIC DEVICE SCREENS

(71) Applicant: ecoATM, LLC, San Diego, CA (US)

(72) Inventors: Babak Forutanpour, San Diego, CA (US); Jeffrey Ploetner, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/137,261

(22) Filed: Dec. 29, 2020

(65) Prior Publication Data

US 2021/0295494 A1 Sep. 23, 2021

Related U.S. Application Data

(63) Continuation of application No. 16/357,041, filed on Mar. 18, 2019, now Pat. No. 10,909,673, which is a
(Continued)

(51) Int. Cl.
*G06T 7/00* (2017.01)
*G06F 18/22* (2023.01)
(Continued)

(52) U.S. Cl.
CPC ............ *G06T 7/0004* (2013.01); *G06F 18/22* (2023.01); *G06F 18/24* (2023.01); *G06T 7/001* (2013.01);
(Continued)

(58) Field of Classification Search
None
See application file for complete search history.

(56) References Cited

U.S. PATENT DOCUMENTS 3,808,439 A   4/1974 Renius
4,248,334 A   2/1981 Hanley et al.
(Continued)

FOREIGN PATENT DOCUMENTS

CA   2760863       11/2010
CA   2818533 A1    5/2012
(Continued)

OTHER PUBLICATIONS

ColorCrack: Identifying Cracks in Glass James Max Kanter Massachusetts Institute of Technology 77 Massachusetts Ave; Sep. 2017.*
(Continued)

*Primary Examiner* — Nancy Bitar
(74) *Attorney, Agent, or Firm* — Perkins Coie LLP

(57) ABSTRACT

Systems and methods for detecting the cracks in illuminated electronic device screens are disclosed. In one embodiment, the method includes receiving an image of an electronic device screen and retrieving a plurality of kernels, each having values corresponding to a line region and a non-line region, with the orientation of the line region and the non-line region differing for each kernel. At least some of the kernels are applied to the image to obtain, at various locations of the image, values corresponding to the line regions and the non-line regions. Based on the values corresponding to the line regions and the non-line regions, cracks are automatically identified in the electronic device screen.

19 Claims, 7 Drawing Sheets

Related U.S. Application Data continuation of application No. 15/195,828, filed on Jun. 28, 2016, now Pat. No. 10,269,110.

(51) Int. Cl.
*G06F 18/24* (2023.01)
*G06T 7/40* (2017.01)

(52) U.S. Cl.
CPC ...... *G06T 7/40* (2013.01); *G06T 2207/20016* (2013.01); *G06T 2207/30108* (2013.01); *G06T 2207/30121* (2013.01)

(56) References Cited

U.S. PATENT DOCUMENTS

| | | | |
|---|---|---|---|
| 4,519,522 A | 5/1985 | McElwee |
| 4,593,820 A | 6/1986 | Antonie |
| 4,715,709 A | 12/1987 | Sekine et al. |
| 4,821,118 A | 4/1989 | Lafreniere |
| 4,845,636 A | 7/1989 | Walker |
| 4,870,357 A | 9/1989 | Young et al. |
| 4,878,736 A | 11/1989 | Hekker et al. |
| 4,893,789 A | 1/1990 | Novorsky |
| 4,927,051 A | 5/1990 | Falk et al. |
| 4,951,308 A | 8/1990 | Bishop et al. |
| 5,025,344 A | 6/1991 | Maly et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,419,438 A | 5/1995 | Squyres et al. |
| 5,436,554 A | 7/1995 | Decker |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,748,084 A | 5/1998 | Isikoff |
| 5,775,806 A | 7/1998 | Allred |
| 5,839,058 A | 11/1998 | Phillips et al. |
| 5,871,371 A | 2/1999 | Rothenberger et al. |
| 5,920,338 A | 7/1999 | Katz |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,055,512 A | 4/2000 | Dean et al. |
| 6,100,986 A | 8/2000 | Rydningen |
| 6,170,702 B1 | 1/2001 | Zettler et al. |
| 6,181,805 B1 | 1/2001 | Koike et al. |
| 6,228,008 B1 | 5/2001 | Pollington et al. |
| 6,234,812 B1 | 5/2001 | Ivers et al. |
| 6,259,827 B1 | 7/2001 | Nichani |
| 6,264,104 B1 | 7/2001 | Jenkins et al. |
| 6,323,782 B1 | 11/2001 | Stephens et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,597,552 B1 | 7/2003 | Griepentrog et al. |
| 6,633,377 B1 | 10/2003 | Weiss et al. |
| 6,667,800 B1 | 12/2003 | Larsson et al. |
| 6,748,296 B2 | 6/2004 | Banerjee et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 6,947,941 B1 | 9/2005 | Koon |
| D512,964 S | 12/2005 | Kissinger et al. |
| 7,069,236 B1 | 6/2006 | Tsunenari |
| 7,076,449 B2 | 7/2006 | Tsunenari et al. |
| 7,086,592 B2 | 8/2006 | Wagner et al. |
| 7,178,720 B1 | 2/2007 | Strubbe et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,407,392 B1 | 8/2008 | Cooke et al. |
| 7,408,674 B2 | 8/2008 | Moro et al. |
| 7,455,226 B1 | 11/2008 | Hammond et al. |
| 7,520,666 B2 | 4/2009 | Pevzner et al. |
| 7,529,687 B1 | 5/2009 | Phan |
| 7,567,344 B2 | 7/2009 | LeBlanc et al. |
| 7,642,687 B2 | 1/2010 | Kageyama et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li |
| 7,881,965 B2 | 2/2011 | Bowles et al. |
| 7,890,373 B2 | 2/2011 | Junger |
| D640,199 S | 6/2011 | Wilson |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,142,199 B1 | 3/2012 | Almouli |
| 8,195,511 B2 | 6/2012 | Bowles et al. |
| 8,200,533 B2 | 6/2012 | Librizzi et al. |
| 8,200,736 B2 | 6/2012 | Shi |
| 8,215,546 B2 | 7/2012 | Lin et al. |
| 8,239,262 B2 | 8/2012 | Bowles et al. |
| 8,254,883 B2 | 8/2012 | Uchida |
| 8,266,008 B1 | 9/2012 | Siegel et al. |
| 8,340,815 B2 | 12/2012 | Peters et al. |
| 8,369,987 B2 | 2/2013 | Claessen |
| 8,401,914 B1 | 3/2013 | Kim |
| 8,417,234 B2 | 4/2013 | Sanding et al. |
| 8,423,404 B2 | 4/2013 | Bowles et al. |
| 8,429,021 B2 | 4/2013 | Kraft et al. |
| 8,463,646 B2 | 6/2013 | Bowles |
| 8,536,472 B2 | 9/2013 | Wu et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,755,783 B2 | 6/2014 | Brahami et al. |
| 8,806,280 B2 | 8/2014 | Stephenson |
| 8,823,794 B2 | 9/2014 | Suzuki et al. |
| 8,824,136 B1 | 9/2014 | Interian et al. |
| 8,743,215 B1 | 11/2014 | Lee |
| 8,922,643 B2 | 12/2014 | Ji et al. |
| 9,010,627 B1 | 4/2015 | Prasad et al. |
| 9,043,026 B2 | 5/2015 | Lien et al. |
| 9,124,056 B1 | 9/2015 | Lewis, Jr. |
| 9,189,911 B2 | 11/2015 | Kavli et al. |
| 9,195,979 B2 | 11/2015 | Geller |
| 9,256,863 B2 | 2/2016 | Chayon et al. |
| 9,317,989 B2 | 4/2016 | Grow et al. |
| 9,355,515 B2 | 5/2016 | Brahami et al. |
| 9,378,606 B2 | 6/2016 | Chayun et al. |
| 9,390,442 B2 | 7/2016 | Lyle |
| 9,497,563 B2 | 11/2016 | Hornung et al. |
| 9,582,101 B2 | 2/2017 | Chang et al. |
| 9,595,238 B2 | 3/2017 | Won |
| 9,621,947 B1 | 4/2017 | Oztaskent |

(56) References Cited

U.S. PATENT DOCUMENTS

| | | | |
|---|---|---|---|
| 9,641,997 B2 | 5/2017 | Vratskides | |
| 9,697,548 B1 | 7/2017 | Jaff et al. | |
| 9,704,142 B2 | 7/2017 | Ahn | |
| 9,818,160 B2 | 11/2017 | Bowles et al. | |
| 9,866,664 B2 | 1/2018 | Sinha et al. | |
| 9,881,284 B2 * | 1/2018 | Bowles | G06Q 10/30 |
| 9,885,672 B2 | 2/2018 | Forutanpour et al. | |
| 9,904,911 B2 | 2/2018 | Bowles et al. | |
| 9,911,102 B2 | 3/2018 | Bowles | |
| 9,934,644 B2 | 4/2018 | Chayun et al. | |
| 10,032,140 B2 | 7/2018 | Bowles et al. | |
| 10,043,339 B2 | 8/2018 | Walker et al. | |
| 10,044,843 B2 | 8/2018 | Sinha et al. | |
| 10,055,798 B2 | 8/2018 | Bowles et al. | |
| 10,127,647 B2 | 11/2018 | Forutanpour et al. | |
| 10,157,379 B2 | 12/2018 | Singh | |
| 10,157,427 B2 | 12/2018 | Bowles et al. | |
| 10,269,110 B2 * | 4/2019 | Forutanpour | G06T 7/001 |
| 10,275,813 B2 | 4/2019 | Fu | |
| 10,325,440 B2 | 6/2019 | Abdelmalak et al. | |
| 10,339,509 B2 | 7/2019 | Bordeleau et al. | |
| 10,401,411 B2 | 9/2019 | Snook et al. | |
| 10,417,615 B2 | 9/2019 | Bowles et al. | |
| 10,438,174 B2 | 10/2019 | Bowles et al. | |
| 10,445,708 B2 | 10/2019 | Hunt et al. | |
| 10,475,002 B2 | 11/2019 | Silva et al. | |
| 10,496,963 B2 | 12/2019 | Silva et al. | |
| 10,572,946 B2 | 2/2020 | Bowles et al. | |
| 10,679,279 B2 | 6/2020 | Ward | |
| 10,740,891 B1 | 8/2020 | Chen et al. | |
| 10,825,082 B2 | 11/2020 | Librizzi et al. | |
| 10,846,672 B2 | 11/2020 | Dion et al. | |
| 10,853,873 B2 | 12/2020 | Bowles et al. | |
| 10,860,990 B2 | 12/2020 | Bowles et al. | |
| 10,909,673 B2 | 2/2021 | Forutanpour et al. | |
| 10,977,700 B2 | 4/2021 | Bordeleau et al. | |
| 11,010,841 B2 | 5/2021 | Bowles et al. | |
| 11,024,111 B2 | 6/2021 | Abdelmalak et al. | |
| 11,080,662 B2 | 8/2021 | Bowles et al. | |
| 11,080,672 B2 | 8/2021 | Bowles | |
| 11,107,046 B2 | 8/2021 | Bowles | |
| 11,126,973 B2 | 9/2021 | Silva et al. | |
| 11,232,412 B2 | 1/2022 | Hunt et al. | |
| 11,288,789 B1 | 3/2022 | Chen et al. | |
| 11,315,093 B2 | 4/2022 | Bowles | |
| 11,341,471 B2 | 5/2022 | Dion et al. | |
| 11,436,570 B2 | 9/2022 | Bowles et al. | |
| 11,443,289 B2 | 9/2022 | Bowles et al. | |
| 11,462,868 B2 | 10/2022 | Forutanpour et al. | |
| 11,482,067 B2 | 10/2022 | Forutanpour et al. | |
| 11,526,932 B2 | 12/2022 | Bowles et al. | |
| 2001/0025883 A1 | 10/2001 | Ichihara et al. | |
| 2001/0035425 A1 | 11/2001 | Rocco et al. | |
| 2001/0039531 A1 | 11/2001 | Aoki | |
| 2002/0014577 A1 | 2/2002 | Ulrich et al. | |
| 2002/0035515 A1 | 3/2002 | Moreno | |
| 2002/0067184 A1 | 6/2002 | Smith et al. | |
| 2002/0087413 A1 | 7/2002 | Mahaffy et al. | |
| 2002/0112177 A1 | 8/2002 | Voltmer | |
| 2002/0129170 A1 | 9/2002 | Moore et al. | |
| 2002/0157033 A1 | 10/2002 | Cox | |
| 2002/0162966 A1 | 11/2002 | Yoder | |
| 2002/0186878 A1 | 12/2002 | Hoon et al. | |
| 2003/0006277 A1 | 1/2003 | Maskatiya et al. | |
| 2003/0018897 A1 | 1/2003 | Bellis, Jr. et al. | |
| 2003/0025476 A1 | 2/2003 | Trela | |
| 2003/0036866 A1 | 2/2003 | Nair et al. | |
| 2003/0061150 A1 | 3/2003 | Kocher et al. | |
| 2003/0146898 A1 | 8/2003 | Kawasaki et al. | |
| 2003/0170529 A1 | 9/2003 | Sagawa | |
| 2003/0179371 A1 | 9/2003 | Rangarajan et al. | |
| 2003/0191675 A1 | 10/2003 | Murashita | |
| 2003/0197782 A1 | 10/2003 | Ashe | |
| 2003/0204289 A1 | 10/2003 | Banerjee et al. | |
| 2004/0012825 A1 | 1/2004 | Tesavis | |
| 2004/0088231 A1 | 5/2004 | Davis | |
| 2004/0114153 A1 | 6/2004 | Andersen et al. | |
| 2004/0141320 A1 | 7/2004 | Bock et al. | |
| 2004/0150815 A1 | 8/2004 | Sones et al. | |
| 2004/0156557 A1 | 8/2004 | Van Der Weij | |
| 2004/0156667 A1 | 8/2004 | Van Der Weij et al. | |
| 2004/0186744 A1 | 9/2004 | Lux | |
| 2004/0189812 A1 | 9/2004 | Gustavsson | |
| 2004/0200902 A1 | 10/2004 | Ishioroshi | |
| 2004/0205015 A1 | 10/2004 | DeLaCruz | |
| 2004/0235513 A1 | 11/2004 | O'Connell | |
| 2004/0242216 A1 | 12/2004 | Boutsikakis | |
| 2004/0262521 A1 | 12/2004 | Devitt et al. | |
| 2005/0027622 A1 | 2/2005 | Walker et al. | |
| 2005/0043897 A1 | 2/2005 | Meyer | |
| 2005/0109841 A1 | 5/2005 | Ryan et al. | |
| 2005/0128551 A1 | 6/2005 | Yang | |
| 2005/0135917 A1 | 6/2005 | Kauppila et al. | |
| 2005/0137942 A1 | 6/2005 | LaFluer | |
| 2005/0139661 A1 | 6/2005 | Eglen et al. | |
| 2005/0143149 A1 | 6/2005 | Becker et al. | |
| 2005/0167620 A1 | 8/2005 | Cho et al. | |
| 2005/0187657 A1 | 8/2005 | Hashimoto et al. | |
| 2005/0216120 A1 | 9/2005 | Rosenberg et al. | |
| 2005/0222690 A1 | 10/2005 | Wang et al. | |
| 2005/0231595 A1 | 10/2005 | Wang et al. | |
| 2005/0240958 A1 | 10/2005 | Nguyen et al. | |
| 2006/0167580 A1 | 1/2006 | Whittier | |
| 2006/0022827 A1 | 2/2006 | Highham | |
| 2006/0038114 A9 | 2/2006 | Cofer et al. | |
| 2006/0047573 A1 | 3/2006 | Mitchell et al. | |
| 2006/0074756 A1 | 4/2006 | Boykin | |
| 2006/0085158 A1 | 4/2006 | Cakiner | |
| 2006/0184379 A1 | 8/2006 | Tan et al. | |
| 2006/0195384 A1 | 8/2006 | Bauer et al. | |
| 2006/0219776 A1 | 10/2006 | Finn | |
| 2006/0229108 A1 | 10/2006 | Cehelnik | |
| 2006/0235747 A1 | 10/2006 | Hammond et al. | |
| 2006/0217152 A1 | 11/2006 | Fok et al. | |
| 2006/0258008 A1 | 11/2006 | Holler et al. | |
| 2006/0261931 A1 | 11/2006 | Cheng et al. | |
| 2006/0271431 A1 | 11/2006 | Wehr et al. | |
| 2006/0279307 A1 | 12/2006 | Wang et al. | |
| 2006/0280356 A1 | 12/2006 | Yamagashi | |
| 2007/0012665 A1 | 1/2007 | Nelson | |
| 2007/0013124 A1 | 1/2007 | Graef et al. | |
| 2007/0032098 A1 | 2/2007 | Bowles et al. | |
| 2007/0050083 A1 | 3/2007 | Signorelli | |
| 2007/0057815 A1 | 3/2007 | Foy et al. | |
| 2007/0129906 A1 | 6/2007 | Stoecker et al. | |
| 2007/0133844 A1 | 6/2007 | Waehner et al. | |
| 2007/0150403 A1 | 6/2007 | Mock et al. | |
| 2007/0140310 A1 | 7/2007 | Rolton et al. | |
| 2007/0205751 A1 | 9/2007 | Suzuki et al. | |
| 2007/0258085 A1 | 11/2007 | Robbins | |
| 2007/0263099 A1 | 11/2007 | Motta et al. | |
| 2007/0269099 A1 | 11/2007 | Nishino et al. | |
| 2007/0276911 A1 | 11/2007 | Bhumkar | |
| 2007/0281734 A1 | 12/2007 | Mizrachi | |
| 2007/0282999 A1 | 12/2007 | Tu et al. | |
| 2008/0004828 A1 | 1/2008 | Mizrachi | |
| 2008/0027581 A1 | 1/2008 | Saether et al. | |
| 2008/0033596 A1 | 2/2008 | Fausak et al. | |
| 2008/0109746 A1 | 5/2008 | Mayer | |
| 2008/0111989 A1 | 5/2008 | Dufour et al. | |
| 2008/0133432 A1 | 6/2008 | Ramseyer | |
| 2008/0149720 A1 | 6/2008 | Colville | |
| 2008/0167578 A1 | 7/2008 | Bryer et al. | |
| 2008/0177598 A1 | 7/2008 | Davie | |
| 2008/0207198 A1 | 8/2008 | Juric | |
| 2008/0231113 A1 | 9/2008 | Guccione et al. | |
| 2008/0255901 A1 | 10/2008 | Carroll et al. | |
| 2008/0256008 A1 | 10/2008 | Kwok | |
| 2008/0260235 A1 | 10/2008 | Cai et al. | |
| 2008/0277467 A1 | 11/2008 | Carlson | |
| 2008/0281691 A1 | 11/2008 | Pearson et al. | |
| 2008/0296374 A1 | 12/2008 | Gonen et al. | |
| 2008/0303915 A1 | 12/2008 | Omi | |
| 2008/0306701 A1 | 12/2008 | Zhong et al. | |

(56) References Cited

U.S. PATENT DOCUMENTS

| | | |
|---|---|---|
| 2009/0051907 A1 | 2/2009 | Li et al. |
| 2009/0079388 A1 | 2/2009 | Reddy |
| 2009/0078775 A1 | 3/2009 | Giebel et al. |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0156199 A1 | 6/2009 | Steenstra et al. |
| 2009/0160668 A1 | 6/2009 | Crowley et al. |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0185506 A1 | 7/2010 | Wolff |
| 2010/0219234 A1 | 9/2010 | Forbes |
| 2010/0235198 A1 | 9/2010 | Fini et al. |
| 2010/0237854 A1 | 9/2010 | Kumhyr et al. |
| 2010/0260271 A1 | 10/2010 | Kapoor |
| 2010/0262481 A1 | 10/2010 | Baker et al. |
| 2010/0312639 A1 | 12/2010 | Mastronardi |
| 2011/0035322 A1 | 2/2011 | Lively |
| 2011/0043628 A1 | 2/2011 | Yun |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0113479 A1 | 5/2011 | Ganem |
| 2011/0296508 A1 | 12/2011 | Os et al. |
| 2011/0313840 A1 | 12/2011 | Mason et al. |
| 2012/0004761 A1 | 1/2012 | Madruga |
| 2012/0016518 A1 | 1/2012 | Saario et al. |
| 2012/0022965 A1 | 1/2012 | Seergy |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0030399 A1 | 2/2012 | Ben-Harosh |
| 2012/0054113 A1 | 3/2012 | Jayaraman et al. |
| 2012/0063501 A1 | 3/2012 | Aguren |
| 2012/0078413 A1 | 3/2012 | Baker |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0235812 A1 | 9/2012 | Mello et al. |
| 2012/0254046 A1 | 10/2012 | Librizzi et al. |
| 2012/0280934 A1 | 11/2012 | Ha |
| 2012/0301009 A1 | 11/2012 | Dabic |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0041508 A1 | 2/2013 | Hu et al. |
| 2013/0046611 A1 | 2/2013 | Bowles et al. |
| 2013/0046699 A1 | 2/2013 | Bowles et al. |
| 2013/0112440 A1 | 5/2013 | Alsaif et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0159119 A1 | 6/2013 | Henderson et al. |
| 2013/0173430 A1 | 7/2013 | Benjamin |
| 2013/0173434 A1 | 7/2013 | Hartman |
| 2013/0181935 A1 | 7/2013 | McKenzie et al. |
| 2013/0198089 A1 | 8/2013 | Bowles |
| 2013/0198144 A1 | 8/2013 | Bowles |
| 2013/0246211 A1 | 9/2013 | Sullivan |
| 2013/0253700 A1 | 9/2013 | Carson et al. |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |
| 2014/0046845 A1 | 2/2014 | Dogin et al. |
| 2014/0052329 A1 | 2/2014 | Amirpour |
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0150100 A1 | 5/2014 | Gupta et al. |
| 2014/0156883 A1 | 6/2014 | Bowles |
| 2014/0214505 A1 | 7/2014 | Shuster-Arechiga et al. |
| 2014/0235258 A1 | 8/2014 | Wang et al. |
| 2014/0244315 A1 | 8/2014 | Cahill et al. |
| 2014/0278244 A1 | 9/2014 | Humphrey et al. |
| 2014/0297368 A1 | 10/2014 | Ferder |
| 2014/0347473 A1 | 11/2014 | Wolff et al. |
| 2015/0006281 A1 | 1/2015 | Takahashi |
| 2015/0066677 A1 | 3/2015 | Bowles et al. |
| 2015/0088731 A1 | 3/2015 | Ackerman |
| 2015/0120485 A1 | 4/2015 | Nash |
| 2015/0170237 A1 | 6/2015 | Powell |
| 2015/0193797 A1 | 7/2015 | Gerrity |
| 2015/0206200 A1 | 7/2015 | Edmondson et al. |
| 2015/0278529 A1 | 10/2015 | Cho et al. |
| 2015/0293860 A9 | 10/2015 | Bowles |
| 2015/0309912 A1 | 10/2015 | Nguyen et al. |
| 2015/0324761 A1 | 11/2015 | Nguyen et al. |
| 2015/0324870 A1 | 11/2015 | Nguyen et al. |
| 2015/0332206 A1 | 11/2015 | Trew et al. |
| 2015/0356637 A1 | 12/2015 | Graffia et al. |
| 2016/0019607 A1 | 1/2016 | Burmester et al. |
| 2016/0019685 A1 | 1/2016 | Nguyen et al. |
| 2016/0055392 A1* | 2/2016 | Nakano ............... G06K 9/4633 382/173 |
| 2016/0078434 A1 | 3/2016 | Huxham et al. |
| 2016/0087381 A1 | 3/2016 | Wong et al. |
| 2016/0092849 A1 | 3/2016 | Cirannek et al. |
| 2016/0125612 A1 | 5/2016 | Seki et al. |
| 2016/0171544 A1 | 6/2016 | Heminger et al. |
| 2016/0171575 A1 | 6/2016 | Bowles et al. |
| 2016/0184990 A1 | 6/2016 | Song et al. |
| 2016/0210648 A1 | 7/2016 | Cirannek et al. |
| 2016/0269401 A1 | 9/2016 | Saito et al. |
| 2016/0269895 A1 | 9/2016 | Soini et al. |
| 2016/0275460 A1 | 9/2016 | Ploetner et al. |
| 2016/0275518 A1 | 9/2016 | Bowles et al. |
| 2016/0301786 A1 | 10/2016 | Koltsov et al. |
| 2016/0379287 A1 | 12/2016 | Dabiri |
| 2017/0083886 A1 | 3/2017 | Silva et al. |
| 2017/0091823 A1 | 3/2017 | Adinarayan et al. |
| 2017/0115235 A1 | 4/2017 | Ohlsson et al. |
| 2017/0169401 A1 | 6/2017 | Beane et al. |
| 2017/0278191 A1 | 9/2017 | Tassone et al. |
| 2017/0301010 A1 | 10/2017 | Bowles et al. |
| 2017/0323279 A1 | 11/2017 | Dion et al. |
| 2017/0343481 A1 | 11/2017 | Jahanshahi et al. |
| 2018/0084094 A1 | 3/2018 | Sinha et al. |
| 2018/0157246 A1 | 6/2018 | Huang et al. |
| 2018/0321163 A1 | 11/2018 | Casadio |
| 2018/0342050 A1 | 11/2018 | Fitzgerald et al. |
| 2019/0066439 A1 | 2/2019 | Pinkus |
| 2019/0222748 A1 | 7/2019 | Weir et al. |
| 2019/0251777 A1 | 8/2019 | Abdelmalak et al. |
| 2020/0090137 A1 | 3/2020 | Bowles et al. |
| 2020/0167748 A1 | 5/2020 | Dion et al. |

(56) References Cited

U.S. PATENT DOCUMENTS

| | | |
|---|---|---|
| 2020/0202319 A1 | 6/2020 | Forutanpour et al. |
| 2020/0241891 A1 | 7/2020 | Li et al. |
| 2020/0265487 A1 | 8/2020 | Forutanpour et al. |
| 2020/0393742 A1 | 12/2020 | Dion et al. |
| 2021/0012315 A1 | 1/2021 | Priebatsch |
| 2021/0081914 A1 | 3/2021 | Nelms et al. |
| 2021/0110366 A1 | 4/2021 | Dion et al. |
| 2021/0110440 A1 | 4/2021 | Dion et al. |
| 2021/0174312 A1 | 6/2021 | Bowles et al. |
| 2021/0192484 A1 | 6/2021 | Forutanpour et al. |
| 2021/0224867 A1 | 7/2021 | Bordeleau et al. |
| 2021/0272208 A1 | 9/2021 | Leise et al. |
| 2021/0295494 A1 | 9/2021 | Forutanpour et al. |
| 2022/0027879 A1 | 1/2022 | Bowles et al. |
| 2022/0051212 A1 | 2/2022 | Forutanpour et al. |
| 2022/0051300 A1 | 2/2022 | Forutanpour et al. |
| 2022/0051301 A1 | 2/2022 | Forutanpour et al. |
| 2022/0051507 A1 | 2/2022 | Forutanpour et al. |
| 2022/0067798 A1 | 3/2022 | Forutanpour et al. |
| 2022/0068076 A1 | 3/2022 | Forutanpour et al. |
| 2022/0114854 A1 | 4/2022 | Forutanpour et al. |
| 2022/0172178 A1 | 6/2022 | Forutanpour et al. |
| 2022/0198407 A1 | 6/2022 | Beane et al. |
| 2022/0262189 A1 | 8/2022 | Dion et al. |
| 2022/0284406 A1 | 9/2022 | Hunt et al. |
| 2022/0292464 A1 | 9/2022 | Silva et al. |
| 2022/0318774 A1 | 10/2022 | Bowles |
| 2023/0007937 A1 | 1/2023 | Forutanpour et al. |
| 2023/0077844 A1 | 3/2023 | Bowles et al. |
| 2023/0100849 A1 | 3/2023 | Bowles et al. |

FOREIGN PATENT DOCUMENTS

| | | |
|---|---|---|
| CA | 2866147 | 9/2013 |
| CN | 1365479 | 8/2002 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 202351953 | 7/2012 |
| CN | 102654927 | 8/2012 |
| CN | 202394296 | 8/2012 |
| CN | 102682597 A | 9/2012 |
| CN | 102930642 | 2/2013 |
| CN | 102976004 | 3/2013 |
| CN | 103198562 | 7/2013 |
| CN | 103226870 | 7/2013 |
| CN | 203242065 | 10/2013 |
| CN | 103440607 | 12/2013 |
| CN | 103514641 | 1/2014 |
| CN | 103544772 | 1/2014 |
| CN | 203408902 | 1/2014 |
| CN | 103662541 | 3/2014 |
| CN | 103679147 A | 3/2014 |
| CN | 203520502 | 4/2014 |
| CN | 103824387 A | 5/2014 |
| CN | 203588366 U | 5/2014 |
| CN | 103843040 | 6/2014 |
| CN | 103954626 | 7/2014 |
| CN | 302944037 S | 9/2014 |
| CN | 302944252 S | 9/2014 |
| CN | 302944253 S | 9/2014 |
| CN | 303042750 S | 12/2014 |
| CN | 205129815 U | 4/2016 |
| CN | 205132514 U | 4/2016 |
| CN | 205140067 U | 4/2016 |
| CN | 106022379 A | 10/2016 |
| CN | 303896361 S | 10/2016 |
| CN | 106203643 A | 12/2016 |
| CN | 105444678 B | 3/2018 |
| CN | 114897847 * | 5/2022 |
| DE | 10031532 | 10/2001 |
| EP | 0116970 | 12/1991 |
| EP | 0654003 | 5/1995 |
| EP | 1168253 | 1/2002 |
| EP | 1270905 | 1/2003 |
| EP | 1703436 | 9/2006 |
| EP | 3206194 A1 | 8/2017 |
| EP | 2428072 | 1/2018 |
| FR | 3047833 B1 | 3/2018 |
| GB | 2167553 | 5/1986 |
| HK | 30014296 A | 8/2020 |
| JP | 7112801 | 5/1995 |
| JP | H7334583 | 12/1995 |
| JP | H11242005 | 9/1999 |
| JP | 2000121564 | 4/2000 |
| JP | 2000171409 A | 6/2000 |
| JP | 2000180371 | 6/2000 |
| JP | 3123095 | 1/2001 |
| JP | 2001312766 | 11/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290852 | 12/2009 |
| JP | 2010177720 | 8/2010 |
| JP | 2010276896 | 12/2010 |
| JP | 2011518387 | 6/2011 |
| JP | 2012504832 | 2/2012 |
| JP | 2012058932 | 3/2012 |
| JP | 2013033361 | 2/2013 |
| JP | 2013037441 | 2/2013 |
| JP | 2017093938 | 6/2017 |
| KR | 20000064168 | 11/2000 |
| KR | 20010074614 | 8/2001 |
| KR | 20010097567 | 11/2001 |
| KR | 100766860 | 10/2007 |
| KR | 20130085255 | 7/2013 |
| KR | 101329949 | 11/2013 |
| KR | 20140037543 | 3/2014 |
| WO | WO8503790 | 8/1985 |
| WO | WO2001015096 | 3/2001 |
| WO | WO2002005176 | 1/2002 |
| WO | WO0221090 | 3/2002 |
| WO | WO2002025613 | 3/2002 |
| WO | WO2002039357 | 5/2002 |
| WO | WO2003012717 | 2/2003 |
| WO | WO2003014994 | 2/2003 |

(56) References Cited

FOREIGN PATENT DOCUMENTS

| | | |
|---|---|---|
| WO | WO2004021114 | 3/2004 |
| WO | WO2004114490 | 12/2004 |
| WO | WO2005008566 | 1/2005 |
| WO | WO2005101346 | 10/2005 |
| WO | WO2006021825 | 3/2006 |
| WO | WO2006058601 | 6/2006 |
| WO | WO2006080851 | 8/2006 |
| WO | WO2007066166 | 6/2007 |
| WO | WO2009089607 | 7/2009 |
| WO | WO2009128173 | 10/2009 |
| WO | WO2009128176 | 10/2009 |
| WO | WO2009129526 | 10/2009 |
| WO | WO2010040116 | 4/2010 |
| WO | WO2010128267 | 11/2010 |
| WO | WO2010128315 | 11/2010 |
| WO | WO2011131016 | 10/2011 |
| WO | WO2012073126 | 6/2012 |
| WO | WO2013002748 | 1/2013 |
| WO | WO2013074819 | 5/2013 |
| WO | WO2014075055 | 5/2014 |
| WO | WO2014141180 | 9/2014 |
| WO | WO2015022409 | 2/2015 |
| WO | WO2015093676 | 6/2015 |
| WO | WO2015108864 | 7/2015 |
| WO | WO2016181224 | 11/2016 |
| WO | WO2015196175 | 12/2016 |
| WO | WO2017081527 | 5/2017 |
| WO | WO2017156046 | 9/2017 |
| WO | WO2019012505 | 1/2019 |
| WO | WO2019012506 | 1/2019 |
| WO | WO2021019286 | 2/2021 |

OTHER PUBLICATIONS

2006 Florida Statutes Title XXXIII, Chapter 538, Sections 538.03 and 538.04, 7 pages.

3GPP Organizational Partners, "3rd Generation Partnership Project; Technical Specification Group Terminals; AT command set for GSM Mobile Equipment (ME)," Global System for Mobile Communications, 1998, 124 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Bhule et al., "Environmental and economic trade-offs in consumer electronic products Recycling: a case study of cell phones and computers," IEEE International Symposium on Electronics and the Environment, Conference Record, 2004.

Bournique, D.: "Mobile Karma Shuts Down As iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.

Business Wire, "The World's First Office Photography Machine" at CES 2008 Launched by Ortery Technologies, Jan. 7, 2008, 3 pages.

CNET, "Tackling LCD "burn ins", and dead/stick Pixels", published Sep. 2, 2009, retrieved from http://www.cnet.com/news/tackling-lcd-burn-ins-and-deadstuck-pixels/.

Cybercom Group Europe AB, "OMSI Forum," Downloads, 2005, 2 pages.

Cybercom Group Europe AB, "OMSI Provides Easy Service and Maintenance for Mobile Phones," Press Release, 2005, 1 page.

Cybercom Group Europe AB, "The OMSI 2.0 Interface Supports," OMSI 2.0 Description, available at least before Oct. 2008, 1 page.

Cybercom Group, "Leading Telecom Organisations Draft IDS 10/26ress Device Management Issues," Press Release, 2007, 1 page.

Evgenii Masunov, Mar. 25, 2010, http://www.appleinsider.ru/news/ipone-obladaet-luchshim-tachskrinom-provereno_robotom.html, 4 pages.

Foster et al., "Automated Visual Inspection: A Tutorial" 1990 Computers Ind. Engng. vol. 18(4): 493-504.

Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.

Geyer et al. "The economics of cell phone reuse and recylcing," The International Journal of Advanced Manufacturing Technology, 47(5): 515-525, 2010.

Graffia et al., "Retail Station for E-Device Identification, Assessment, and Trade-In", Jun. 6, 2014 (Drawings and Specification) (Year: 2014).

GSM Arena Glossary, "LCD (Liquid Crystal Display", retrieved from http://www.gsmarena.com/glossary.php3?term=lcd on Apr. 28, 2016, 1 page.

International Numbering Plan, www.numberingplans.com, 2 pages.

Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].

Kanter, James Max, "Color Crack:ldentifying Cracks in Glass," dated Dec. 9, 2014 retrieved from the internet http://www.jmaxkanter.com/static/papers/color crack.pdf on Sep. 22, 2017.

Lambert, Emily, "Use It Up, Wear It Out", Forbes 175.5 (2005): 77-78. Business Source Complete. Web. Jan. 6, 2015, 3 pages.

Littleton Partners with Donations Ink (Jan. 19, 2006) US Fed News Service, Including US State News. Web. Jan. 6, 2015, 1 page.

MobileGazette.Com, "2006 in Review: The Good, The Bad and The Ugly", published Dec. 2006, retrieved from http://www.mobilegazette.com/2006-review-06x12x22.htm on Nov. 11, 2015.

Oliveira, et al., "Automatic crack detection on road imagery using anisotropic diffusion and region linkage," 18th European Signal Processing Conference (EUSIPCO-2010), Aug. 23, 2010, pp. 274-278.

PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.

Perng et al., "A Novel Vision System for CRT Panel Auto-Inspection", Journal of the Chinese Institute of Industrial Engineers, vol. 24, No. 5, pp. 341-350 (2007).

Perng et al., "A Novel Vision System for CRT Panel Auto-Inspection", Proceedings of the 2005 IEEE International Conference on Mechatronics, Jul. 10-12, 2005, pp. 4.

Phifer, "How to Use your 3G Phone as a Wireless Broad Band Modem," Computer Weekly News, 2007, 6 pages.

Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.

Rehg et al. "Vision for a Smart Kiosk" IEEE, Computer Society Conference on Computer Vision and Pattern Recognition (1997).

RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.

Rolf Steinhilper "Remanufacturing: The Ultimate Form of Recycling", Fraunhofer IRBVerlag, 1998, parts 1-3, http://www.reman.org/Publications_main.htm.

Romano "Recycling a Phone at EcoATM is an Easy Route To Feeling Green," Xconomy, Jan. 22, 2014, pp. 1-3.

Rosebrock, "How to Build a Kick-Ass Mobile Document Scanner in Just 5 Minutes" Pylmage Search, Sep. 2014, 19 pages.

Shotton et al., "Efficiently Combining Contour and Texture Cues for Object Recognition", Proceedings of the British Machine Vision Conference 2008, (Sep. 1, 2008), pp. 7.1-7.10 * abstract *.

Shue, Jiuh-Biing et al. "Extended consumer responsibility: Syncretic value-oriented pricing strategies for trade-in-for-upgrade programs" Transportation Research Part E: Logistics and Transportation Review 122 (2019) 350-367.

SimplySellular, "Get Cash for your Old Cell Phone", published Apr. 2, 2010, retrieved from http://simplysellular.com/conditions.php on Jan. 6, 2015, 2 pages.

(56) References Cited

OTHER PUBLICATIONS

Sony Ericsson Mobile Communications AB, "P800/P802," White Paper, 2003, 128 pages.
Sony Ericsson Mobile Communications AB, "T68i/T68ie," White Paper, 2002, 71 pages.
Tecace Software: "Your phone appraisal-Movaluate—Android Apps on Google Play", Android Apps On Google Play, Aug. 12, 2013 (Aug. 12, 2013), XP055230264, Retrieved from the Internet <URL:https://play.google.com/store/apps/details?id=com.tecace.android, app.movaluate&hl=en>; accessed Nov. 27, 2017; 2 pages.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year 2010).
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wiley Encyclopedia of Computer Science and Technology (2009).
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Wu, "Overview of Wireless Power and Data Communication" WPC/QI Developers Forum, Oct. 29, 2016, 21 pages.
Yahoo Answers, "What is a Clean ESN?" published Jun. 23, 2009, retrieved from http://web.archive.org/web/20090623215042/http://answers.yahoo.com/question/inde,8020 US?qid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
Non-Final Office Action dated Feb. 9, 2018 in U.S. Appl. No. 15/195,828, 8 pages.
Non-Final Office Action dated Mar. 5, 2020 in U.S. Appl. No. 16/357,041, 9 pages.
Non-Final Office Action Response dated Aug. 8, 2018 in U.S. Appl. No. 15/195,828, 17 pages.
Non-Final Office Action Response dated Sep. 4, 2020 in U.S. Appl. No. 16/357,041, 16 pages.
Notice of Allowance dated Nov. 28, 2018 in U.S. Appl. No. 15/195,828, 15 pages.
Notice of Allowance dated Sep. 28, 2020 in U.S. Appl. No. 16/357,041, 13 pages.
International Search Report and Written Opinion dated Oct. 10, 2017 in International Application No. PCT/US2017/039639, 19 pages.

\* cited by examiner

# US 11,803,954 B2

METHODS AND SYSTEMS FOR DETECTING CRACKS IN ILLUMINATED ELECTRONIC DEVICE SCREENS

CROSS-REFERENCE TO RELATED APPLICATION

This application is a continuation of U.S. patent application Ser. No. 16/357,041, filed Mar. 18, 2019, now pending, which is a continuation of U.S. patent application Ser. No. 15/195,828, titled "METHODS AND SYSTEMS FOR DETECTING CRACKS IN ILLUMINATED ELECTRONIC DEVICE SCREENS," and filed Jun. 28, 2016, now issued as U.S. Pat. No. 10,269,110, the disclosures of which are hereby incorporated by reference in their entireties.

TECHNICAL FIELD

The present disclosure is directed generally to methods and systems for evaluating mobile phones and other consumer electronic devices and, more particularly, to methods and systems associated with detecting cracks in screens of such devices.

BACKGROUND

It is often necessary to visually evaluate a screen of a mobile device (e.g., a smartphone or tablet) to identify cracks or other defects in the mobile device. For example, pricing the mobile device, assessing the mobile device for possible repair, and evaluating the mobile device for warranty coverage all may require identification of any cracks in the mobile device's screen and/or in non-screen portions of the device. Individualized manual inspection of mobile device screens for cracks is slow, cumbersome, and can yield inconsistent results. Current automated methods for detecting cracks in other contexts are often over-inclusive resulting in high rates of false-positive crack indications, particularly when the mobile device screen is illuminated. Accordingly, there is a need for improved methods and systems for automatically detecting cracks in mobile device screens.

DETAILED DESCRIPTION

Overview

Figure 1:
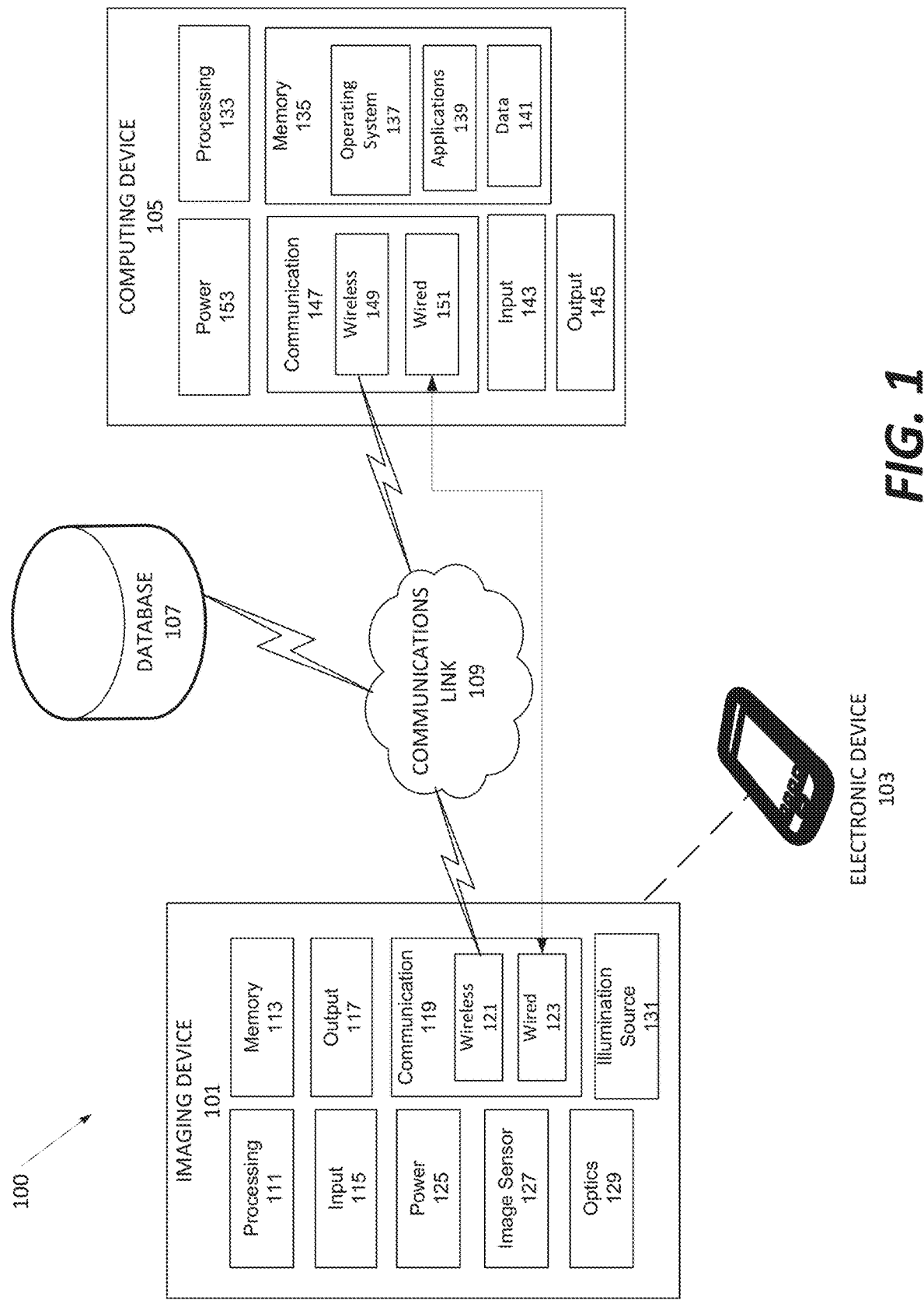
FIG. 1 is a schematic diagram illustrating components of a suitable computing environment for implementing various aspects of the present technology.

The following disclosure describes systems and methods for automated visual inspection and evaluation of electronic device screens. In particular, at least some embodiments of the present technology enable automatic crack detection in illuminated electronic device screens, which pose particular problems for conventional crack-detection techniques. Illuminated electronic device screens—that is, screens that are actively emitting light—pose particular difficulties in detecting cracks as the images displayed by the emitted light can result in improper crack identification.

To detect cracks, in accordance with some embodiments, an image of the illuminated electronic device screen is obtained under both lighted conditions (i.e., an external light is applied during the image capture) and unlighted conditions (i.e., no external light is applied during the image capture). The unlighted image can then be subtracted from the lighted image which reduces the intensity of the illuminated image of the device screen. The resulting image can be enhanced and converted to grayscale before performing crack detection.

In one embodiment, the routine can first identify cracks in non-screen regions of the image. If no cracks are found in this region, then the routine can identify cracks in the screen region utilizing the methods as described herein. In some embodiments, for example, the routine can first generate an "image pyramid" in which multiple different images are generated by scaling and subsampling the images. For example, a first "layer" in the image pyramid is the original image, the second downsampled by a factor of 2 in each direction, a third layer is downsampled by a factor of 3 in each direction, a fourth layer is downsampled by a factor of 4 in each direction, etc. Next, the routine can begin with a first layer of the image pyramid and convolve the image with a set of multiple kernels (also called convolution matrices) configured to identify energy response above some threshold for a line at various angles. Each kernel can include a line configured to correspond to a crack at or near a particular angular orientation (e.g., 5 degrees with respect to the horizontal, 15 degrees, 30 degrees, 45 degrees, etc.). Each kernel can further include four regions or quadrants: the left portion of the line (LL), the right portion of the line (RL), above the line (AL), and below the line (BL). The values computed in each of these regions (e.g., minimum brightness, maximum brightness, average brightness, and standard deviation of brightness) can be used to determine whether a line in the image that corresponds to that particular kernel is identified in that location, indicating the presence of a crack at that location. For example, if the average brightness of the LL and RL regions is greater than the average brightness of the AL and BL regions by some amount (e.g., by 8 or more brightness units), then a crack is indicated for that kernel at that location. At a given location, each kernel can be applied in sequence until a crack is identified. If no crack is identified, an adjacent location is selected (e.g., by translating some predetermined number of pixels away from the previous location), and the kernels are again applied in sequence. This continues until the kernels have swept across all locations corresponding to the screen region of the electronic device. If the number of identified cracks in that layer exceeds some predetermined threshold, then the screen is considered cracked. If the number of identified cracks do not exceed the predetermined threshold, then the process repeats with the next layer in the image pyramid. This iterative process can advantageously identify cracks in illuminated electronic device screens without unduly misidentifying images from the illuminated screens as cracks.

Certain details are set forth in the following description and in FIGS. 1-5D to provide a thorough understanding of various embodiments of the present technology. In other instances, well-known structures, materials, operations and/or systems often associated with smartphones and other handheld devices, consumer electronic devices, computer hardware, software, and network systems, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. The terminology used below should be interpreted in the broadest reasonable manner, even though it is being used in conjunction with a detailed description of certain examples of embodiments of the technology. Indeed, certain terms may even be emphasized below; however, any terminology intended to be interpreted in any restricted manner will be specifically defined as such in this Detailed Description section.

The accompanying Figures depict embodiments of the present technology and are not intended to be limiting of the scope of the present technology. The sizes of various depicted elements are not necessarily drawn to scale, and these various elements may be arbitrarily enlarged to improve legibility. Component details may be abstracted in the Figures to exclude details such as the position of components and certain precise connections between such components when such details are unnecessary for a complete understanding of how to make and use the invention.

In the Figures, identical reference numbers may identify identical, or at least generally similar, elements. To facilitate the discussion of any particular element, the most significant digit or digits of any reference number may refer to the Figure in which that element is first introduced. For example, element 101 is first introduced and discussed with reference to FIG. 1.

Detection of Cracks in Illuminated Electronic Device Screens

FIG. 1 illustrates an embodiment of an environment 100 in which various aspects of the present technology can be implemented. The environment 100 includes an imaging device 101 configured to obtain images and/or video of an electronic device 103 (e.g., a mobile phone, tablet, notebook, etc.). The imaging device 101 is in communication with a computing device 105 and a database 107 via a communications link 109. In at least one embodiment, the imaging device 101 is positioned within a consumer-operated kiosk that can be used to evaluate and recycle the electronic device 103.

The imaging device 101 includes a processing component 111, a memory 213, input and output components 115 and 117, and a power component 125. The imaging device 101 further includes an image sensor 127, associated optics 129, an illumination source 131, and a communication component 119. The communication component 119 includes a wired connection 123 and a wireless transceiver 121. The computing device 105 can include several components similar to components of the imaging device 101. For example, the computing device 105 can include a processing component 133, memory 135 (which can store an operating system 137, applications 139, and data 141), along with input 143 and output 145 components and a power component 153. A communication component 147 of the computing device 105 includes a wired connection 151 and a wireless transceiver 147. These features of the imaging device 101 and the computing device 105 are described in more detail below in the context of a routine for detecting cracks in illuminated electronic device screens in accordance with an embodiment of the present technology.

Figure 2:
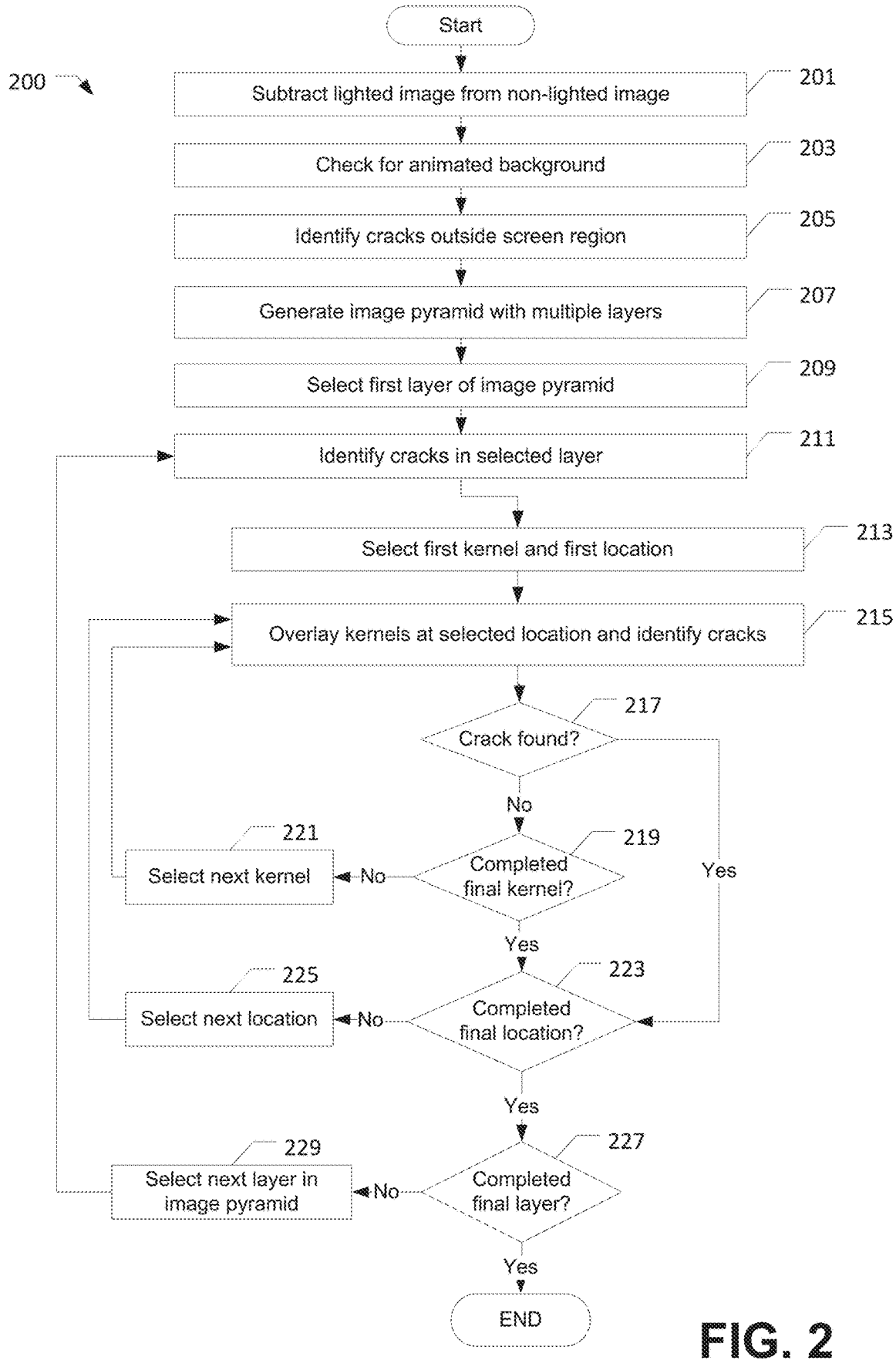
FIG. 2 is a flow diagram of a routine for identifying cracks in an illuminated electronic device screen, in accordance with an embodiment of the relevant technology.
Figure 3A:
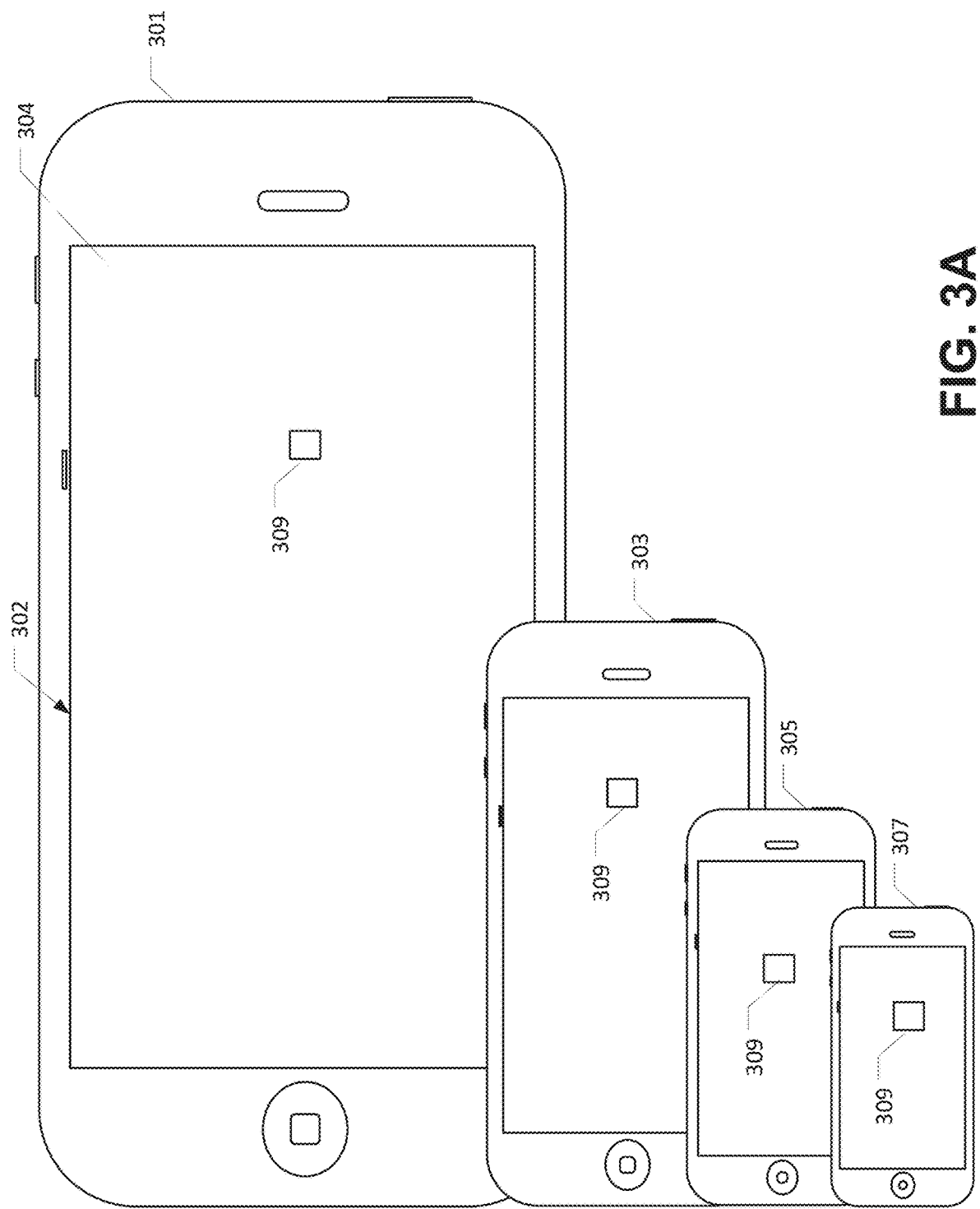
FIG. 3A illustrates an image pyramid of an electronic device with multiple layers for use in the routine of FIG. 2.
Figure 3B:
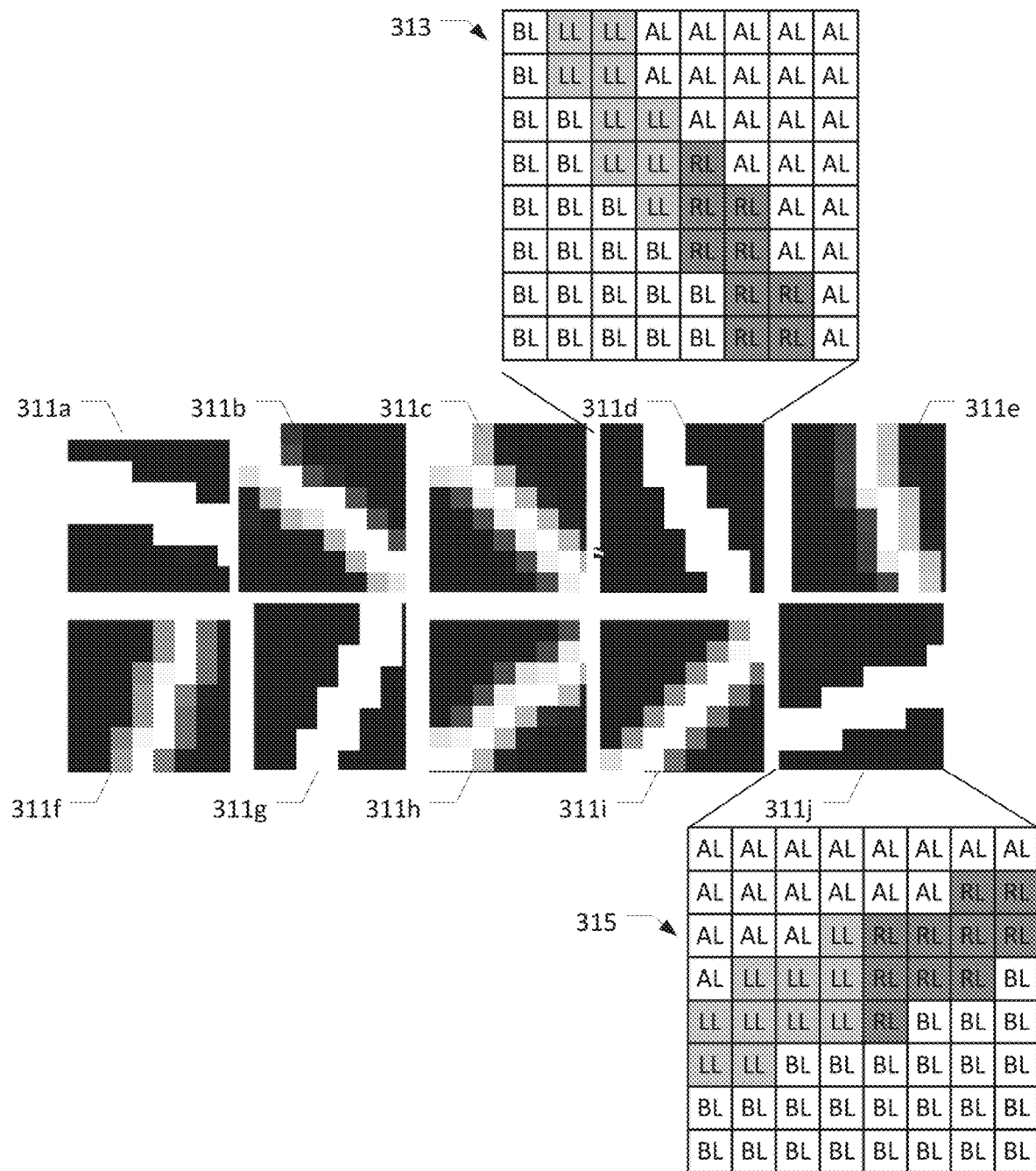
FIG. 3B illustrates a variety of kernels for use in the routine of FIG. 2, in accordance with an embodiment of the relevant technology.

FIG. 2 is a flow diagram of a routine for identifying cracks in an illuminated electronic device screen in accordance with an embodiment of the present technology. FIG. 3A illustrates an image pyramid of an electronic device with multiple layers, and FIG. 3B illustrates a variety of kernels for use in the routine of FIG. 2. The routine 200 of FIG. 2 can be carried out by the computing device 105 or another suitable computing device. With reference to FIGS. 2-3B together, the routine 200 begins in block 201 by subtracting a lighted image of an electronic device with an illuminated screen from a non-lighted image of the electronic device with the illuminated screen. For example, an image of the illuminated electronic device screen is obtained under both a lighted condition (i.e., an external light is applied during the image capture) and an unlighted condition (i.e., no external light is applied during the image capture). For example, the images can be obtained with the imaging device 101 and electronically transmitted to the computing device 105. The unlighted image can then be subtracted from the lighted image, which reduces the intensity of the illuminated image of the device screen. In some embodiments, the resulting image is then enhanced and converted to grayscale before performing crack detection.

In block 203, the routine 200 checks for an animated background by, for example, determining whether there is a large discrepancy in the screen portion of the image between the lighted image and the non-lighted image, or between subsequent images taken under the same lighting conditions. In one embodiment, several images of the screen can be taken in succession, and each image can then be subtracted from the others, or sequentially, or each from the first image, etc. The resulting difference can then be evaluated, e.g., if a brightness in the screen region of the resulting difference exceeds a predetermined threshold, then a discrepancy is identified. A discrepancy indicates an animated or otherwise changing wallpaper or background, which may deleteriously affect the operation of the routine 200. Accordingly, if an animated background is identified, a user can be prompted to disable this feature or the crack detection routine can be bypassed altogether.

In block 205, the routine 200 identifies cracks outside the screen region. This can be performed by the computing device using crack detection techniques such as a Canny edge detector, Hough transform, and other automated crack detection techniques, such as those described in more detail in co-pending and commonly owned U.S. patent application Ser. No. 15/130,851, titled METHODS AND SYSTEMS FOR DETECTING CRACKS IN ELECTRONIC DEVICES, filed Apr. 15, 2016, which is hereby incorporated by reference in its entirety. In some embodiments, if there are cracks found in the region outside the screen, then the phone is identified as "damaged" and the remainder of the crack detection process described below is bypassed. If no cracks are found in this region, then the routine can proceed to identify cracks in the screen region as described below.

Next, in block 207 the routine 200 generates an "image pyramid" in which multiple different images are generated by scaling and subsampling the image. FIG. 3A illustrates various layers of an image pyramid of an image of an electronic device. As illustrated, a bottommost "layer" 301 is larger or higher resolution than subsequent layers 303, 305, and 307. Each subsequent layer of the pyramid is downsampled to a greater degree. For example, the first or bottommost layer 301 in the image pyramid is the original image, the second layer 303 can be downsampled by a factor of 2 in each direction with respect to layer 301, the third layer 305 can be downsampled by a factor of 3 in each direction with respect to layer 301, the fourth layer 307 can be downsampled by a factor of 4 in each direction with respect to layer 301, etc. The layers 301, 303, 305, 307 of the image pyramid provide various sizes and/or resolutions of the image of the electronic device.

As described in more detail below, kernels can be convolved to select regions of these layers. Due to downsampling, the corresponding area of the electronic device screen 302 increases with each subsequent layer. The region 309, for example, illustrates a region corresponding to a particular kernel size and is not necessarily drawn to scale. In one embodiment, the region 309 corresponds to a region of 8×8 pixels in each layer, though in various embodiments the size of the kernels used can vary. As illustrated, the region 309 corresponds to a smaller proportional region of the screen in layer 301 than in layer 303, and similarly the region 309 corresponds to still smaller proportional regions of the screen in layers 305 and 307.

In block 209, the routine 200 selects the first layer 301 of the image pyramid. In one embodiment, the first layer 301 is the bottommost or original image. In block 211, the routine 200 identifies cracks in the selected layer. Identifying cracks involves a subroutine that first selects a first kernel and a first location in block 213. The first location can be, for example, an upper corner 304 of the screen 302 of the electronic device in the selected layer, and the first kernel can be, for example, kernel 311a in FIG. 3B. As the routine 200 proceeds with other kernels (as in block 221), a next kernel is selected, for example kernel 311b in FIG. 3B. This process can continue until all the kernels (e.g., 311a-311j) have been applied to the selected location.

In block 215, the routine 200 overlays the selected kernel at the selected location and identifies cracks. The routine can begin with the first layer of the image pyramid and convolve the image with a set of multiple kernels configured to identify cracks at various angles. Each kernel can be configured to correspond to a crack at or near a particular angular orientation (e.g., 5 degrees with respect to the horizontal, 15 degrees with respect to the horizontal, 30 degrees with respect to the horizontal, 45 degrees with respect to the horizontal, etc.). FIG. 3B illustrates multiple kernels 311a-j. Each of these 10 kernels is configured to detect cracks of different orientations by overlaying each kernel over a particular portion of the image and convolving the kernel with that portion of the image. For example, the kernels 311 can be configured to align with and be overlaid on 8×8 pixel areas (or any other suitable size) in the image under evaluation. Although 10 kernels are illustrated here, in other embodiments there may be more or fewer kernels to provide greater or lesser granularity with respect to the orientation of cracks detected by the kernels. Each kernel includes four regions or quadrants, as illustrated by kernel 313, which is a schematic representation of kernel 311d and kernel 315 which is a schematic representation of kernel 311j. As shown by kernels 313 and 315, the kernels include a left line region (LL) and a right line region (RL). These region are adapted to correspond to left and right portions of a crack if present in the portion of the image to which the kernel is convolved. The kernels also include a below-the-line region (BL) and an above-the-line region (AL). These regions are adapted to correspond to portions outside of the crack in the portion of the image to which the kernel is convolved. Convolving a kernel to a selected portion of an image involves evaluating the pixel values in these four regions to determine if a crack generally corresponding to the orientation of the selected kernel is identified, as described in more detail below. Since the kernel corresponds to a larger proportional area of the screen in higher layers of the pyramid (i.e. those images that have been downsampled to a greater degree), the kernels are configured to detect cracks of greater thicknesses in those layers, and of smaller thicknesses in less downsampled layers. This configuration allows a single kernel (e.g., a kernel configured to detect cracks of approximately 15 degree orientation with respect to the horizontal) to detect cracks of varying thicknesses depending on the layer to which the kernel is applied.

As noted above, the kernel is aligned with a pixel at a selected location and values of the image that correspond to the four quadrants of the kernel (left portion of the line (LL), right portion of the line (RL), above the line (AL), and below the line (BL)) are identified. For each of these quadrants, the routine 200 can calculate the minimum brightness, maximum brightness, average brightness, and standard deviation of brightness. In one embodiment, the average brightness of the line region (Lavg) is calculated by averaging the brightness for the LL and RL regions and is designed as Lavg. The average brightness of the non-line region is then calculated by averaging the brightness for the AL and BL regions, and is designated as ALBLavg. With these values, a number of calculations can be used to determine if cracks are present and to perform secondary checks if cracks are found. By way of example, in one embodiment the selected location is marked as cracked if Lavg is greater than ALBLavg by some threshold amount, e.g. greater than eight brightness units.

If a crack is found at this step, then a series of secondary checks can be applied to reduce the incidence of false-positive crack identification. A first secondary check can include, for example, determining whether the average brightness values for the AL and BL regions (i.e., the non-line regions) are sufficiently close to one another. If the average brightness in these regions differs by greater than some threshold amount (e.g., greater than 5 brightness units apart), then any identified crack is disregarded. This secondary check ensures that the background of the identified crack is consistent.

A second secondary check can exclude any identified crack if either the AL or BL regions (i.e., the non-line regions) are too dark, e.g. having average brightness values less than 35 where the image has been normalized to an average brightness of 140). This excludes false-positives that may be attributable to the location being close to a dark icon displayed on the screen, or an artificial dark spot due to a subtraction artifact.

A third secondary check can exclude any identified crack if the average brightness of the RL and LL regions (Lavg) is much brighter than the average of the AL and BL regions (ALBLavg), for example if Lavg is greater than ALBLavg by more than 50 brightness units. This third secondary check can avoid situations in which characters displayed by the active display are inappropriately categorized as cracks in the initial crack detection process.

A fourth secondary check can exclude any identified crack if the average brightness values for LL and RL (i.e. the line regions) are too far apart, for example greater than 10 brightness units apart from one another. This ensures that any identified underlying crack extends along both the LL and RL regions, thereby excluding false-positives attributable to characters displayed in the active display that align with the LL region moreso than the RL region or vice versa. An actual crack that extends across the location covered by the kernel will tend to yield similar brightness values in the RL and LL regions.

A fifth secondary check can exclude any identified crack if any of the four regions (RL, LL, AL, and BL) have a maximum pixel brightness greater than some threshold value, e.g. greater than 110 brightness units. This can exclude areas in which artificially bright areas due to glints or image processing artifacts can negatively affect the crack-detection algorithm.

A sixth secondary check can exclude any identified crack if any of the four regions (RL, LL, AL, and BL) have a minimum pixel brightness below some value, e.g., less than 25 brightness units. This excludes false-positives that may be attributable to the location being close to a dark icon displayed on the screen or an artificial dark spot due to a subtraction artifact.

A seventh secondary check can evaluate each column and row of the kernel at the location for which a crack was identified to determine whether, for any three adjacent LL or RL values, the brightness values are monotonically increasing or decreasing. For example, kernel 313 shown in FIG. 3B includes at least three adjacent LL values in the third column. To perform the seventh secondary check, the routine 200 determines whether the pixel locations in the image corresponding to those adjacent LL values correspond to increasing or decreasing values. A true crack will tend to have a gradient of brightness across three adjacent LL or RL values, leading to monotonically increasing or decreasing brightness values. Characters presented on an active display, in contrast, may present equal brightness values across three adjacent LL or RL values, and accordingly would not pass this seventh secondary check.

Following the initial crack detection (e.g., if Lavg is greater than ALBLavg by more than some threshold amount), one or more of the secondary checks described above can be performed to confirm the indication of a crack at that location with that kernel. If any of the secondary checks indicate that the identified crack should be disregarded as a false positive, then no crack is found for that kernel at that location. If the initially identified crack passes all of the secondary checks applied, then a crack is indicated and the routine proceeds as described below. In some embodiments, an initially identified crack is excluded only if it fails some threshold number of the secondary checks (e.g., if the initially identified crack fails at least two secondary checks, at least three secondary checks, etc.).

In decision block 217, the routine 200 determines whether a crack is found for the selected kernel at the selected location. If no crack was found during the evaluation of block 215, then the routine 200 proceeds to decision block 219 to determine whether the final kernel has been completed (i.e., there are no remaining kernels in the series that have not yet been convolved at the selected location). If there are remaining kernels, then the routine 200 continues to block 221 to select the next kernel (e.g., moving from kernel 311a to kernel 311b in FIG. 3B) and the process returns to block 215 to overlay the newly selected kernel at the same location.

Returning to decision block 217, if a crack was found during the evaluation of block 215, then after decision block 217 the routine 200 proceeds to decision block 223 to determine whether the final location has been evaluated. If not (i.e., there are remaining locations on the screen in the selected layer that have not yet been evaluated for cracks), then the routine proceeds to block 225, selects the next location (e.g., by moving a predetermined number of pixels to one side) and returns to block 215 to overlay the first kernel at the new location. This process can loop until each location on the screen has been evaluated. The locations can be overlapping portions, for example the adjacent location can be a 8×8 pixel square that is two pixels to the right of the previous 8×8 pixel square. The amount of overlap and the size of the kernels can be varied as desired. In some embodiments, the number of locations at which cracks have been identified is totaled and, if the sum exceeds some threshold value, the routine terminates with an indication that the screen is cracked. If the total number of locations at which cracks have been identified does not exceed the threshold, then the routine can proceed to evaluate additional layers of the image pyramid as described below.

Once the final location has been completed as determined in decision block 223, the routine 200 proceeds to decision block 227 to determine if the final layer has been completed. If not (i.e., there are remaining layers of the image pyramid that have not yet been evaluated), then the routine 200 continues to block 229 to select the next layer in the image pyramid, and returns to block 215 to overlay the first kernel at the first location in the newly selected layer and begins the crack identification process. If, in decision block 227, the routine 200 determines that the final layer has been completed, then the routine 200 ends. At this point, any number of cracks have been identified in various regions of the electronic device screen and in various layers of the image pyramid. These identified cracks can be evaluated to determine an overall crack score for the device, to test whether the total number exceeds a predetermined threshold, or to otherwise evaluate the overall condition of the electronic device for possible purchase.

Computing Environment

Referring again to FIG. 1, additional details are set forth below regarding the computing environment in which the routine 200 can be performed. The imaging device 101 can be, for example, a digital camera (e.g., having a CCD or CMOS sensor) capable of capturing still and/or moving images of the electronic device 103, and transmitting captured images over the communications link 109 to remote devices. In some embodiments, the imaging device 101 can be incorporated into a user-operated kiosk as described in more detail below. The imaging device 101 can include a camera and an associated fixture, base, or other imaging area in which the electronic device 103 is to be placed for imaging. This can provide a standard background against which the images and/or video of the electronic device 103 are obtained. The imaging device 101 and/or the associated optics can be configured in order to capture images and/or video of the electronic device 103 from various angles. The imaging device 101 can also include an illumination source (e.g., LEDs, fluorescent bulbs, lamps, etc.) which can also aid in obtaining images of the electronic device 103 under uniform lighting conditions.

The electronic device 103 can be, for example, a smartphone, a tablet, a laptop, a handheld gaming device, a media player, or any such device submitted for evaluation that has a screen or other surface that may suffer cracks or similar defects. Although many embodiments of the present technology are described herein in the context of mobile phones, aspects of the present technology are not limited to mobile phones and generally apply to other consumer electronic devices. Such devices include, as non-limiting examples, all manner of mobile phones; smartphones; handheld devices; personal digital assistants (PDAs); MP3 or other digital music players; tablet, notebook, ultrabook and laptop computers; e-readers; all types of cameras; GPS devices; set-top boxes and other media players; VoIP phones; universal remote controls; wearable computers; and larger consumer electronic devices, such as desktop computers, TVs, projectors, DVRs, game consoles, etc.

The computing device 105 can be a CPU (e.g., housed within a user-operated kiosk) or another suitable processing device. The computing device 105 is configured to receive images of the electronic device 103 from the imaging device 101 and to automatically analyze the images to detect the presence of cracks or other defects. In some embodiments, the computing device 105 is remote from the imaging device 101 and can be in communication via the communications link 109. In other embodiments, the computing device 105 is connected to the imaging device 101 via a hardwire connection, or in certain embodiments the imaging device 101 and the computing device 105 are integrated into the same machine. The computing device 105 is also in communication with the database 107 which can store data used in automatically analyzing the images of the electronic device 103. The database 107 may also store the results of the automatic analysis of the images, other data about the electronic device 103, etc.

In the illustrated embodiment, various devices including the imaging device 101 and the computing device 105 exchanges information with one another via the communication link 109. Although the communication link 109 can include a publicly available network (e.g., the Internet with a web interface), a private communication link (e.g., an intranet or other network) can also be used. Moreover, in various embodiments the imaging device 101 is connected to a host computer (not shown) that facilitates the exchange of information between the imaging device 101, the computing device 105, remote computers, mobile devices, etc.

In the illustrated embodiment, the imaging device 101 includes the processing component 111 that controls operation of the imaging device 101 in accordance with computer-readable instructions stored in memory 113. The processing component 111 may include any logic processing unit, such as one or more central processing units (CPUs), graphics processing units (GPUs), digital signal processors (DSPs), application-specific integrated circuits (ASICs), etc. The processing component 111 may be a single processing unit or multiple processing units in an electronic device or distributed across multiple devices. Aspects of the present technology can be embodied in a special purpose computing device or data processor that is specifically programmed, configured, or constructed to perform one or more of the computer-executable instructions explained in detail herein. Aspects of the present technology can also be practiced in distributed computing environments in which functions or modules are performed by remote processing devices that are linked through a communications network, such as a local area network (LAN), wide area network (WAN), or the Internet. In a distributed computing environment, modules can be located in both local and remote memory storage devices.

The processing component 111 is connected to memory 113, which can include a combination of temporary and/or permanent storage, and both read-only memory (ROM) and writable memory (e.g., random access memory or RAM), writable non-volatile memory such as flash memory or other solid-state memory, hard drives, removable media, magnetically or optically readable discs, nanotechnology memory, biological memory, and so forth. As used herein, memory does not include a transitory propagating signal per se. The memory 213 includes data storage that contains programs, software, and information, such as an operating system and data. Imaging device 101 operating system and data can include software and databases configured to control imaging device 101 components, process images, communicate and exchange data and information with remote computers and other devices, etc.

The imaging device 101 further includes input components 115 that can receive input from user interactions and provide input to the processing component 111, typically mediated by a hardware controller that interprets the raw signals received from the input device and communicates the information to the processing component 111 using a known communication protocol. Examples of an input component 115 include touchpad, a keyboard (with physical or virtual keys), a pointing device (such as a mouse, dial, or eye tracking device), a touchscreen that detects contact events when it is touched by a user, a microphone that receives audio input, etc. The imaging device 101 can also include various other input components 115 such as GPS or other location determination sensors, motion sensors, wearable input devices with accelerometers (e.g. wearable glove-type input devices), biometric sensors (e.g., fingerprint sensors), light sensors, card readers (e.g., magnetic stripe readers or memory card readers) or the like.

The processing component 111 is also connected to one or more various output components 117, e.g., directly or via a hardware controller. The output devices can include a display on which text and graphics are displayed. The display can be, for example, an LCD, LED, or OLED display screen, an e-ink display, a projected display (such as a heads-up display device), and/or a display integrated with a touchscreen that serves as an input device as well as an output device that provides graphical and textual visual feedback to a user. The output components 117 can also include a speaker for playing audio signals, haptic feedback devices for tactile output such as vibration, etc. In some implementations, a speaker and microphone are implemented by a combined audio input-output device.

In the illustrated embodiment, the imaging device 101 further includes one or more communication components 119. The communication components can include, for example, a wireless transceiver 121 (e.g., one or more of a Wi-Fi transceiver; Bluetooth transceiver; near-field communication (NFC) device; wireless modem or cellular radio utilizing GSM, CDMA, 3G and/or 4G technologies; etc.) and/or a wired network connection 123 (e.g., one or more of an Ethernet port, cable modem, FireWire cable, Lightning connector, universal serial bus (USB) port, etc.). The communication components 119 are suitable for communication between the imaging device 101 and other local and/or remote devices, e.g., the computing device 105, directly via a wired or wireless peer-to-peer connection and/or indirectly via the communication link 109 (which can include the Internet, a public or private intranet, a local or extended Wi-Fi network, cell towers, the plain old telephone system (POTS), etc.). For example, the wireless transceiver 121 of the imaging device 101 can connect to a wireless transceiver 149 of the computing device via the wireless connection. The imaging device 101 further includes power 125, which can include battery power and/or facility power for operation of the various electrical components associated with the imaging device 101.

The imaging device 101 further includes the image sensor 127, optics 129, and illumination source 131. The image sensor 127 can be, for example, a CCD sensor, a CMOS sensor, or any other type of image sensor or array of sensors. The image sensor 127 can be aligned with optics 129, for example one or more lenses, filters, or other optical elements, configured to orient and modulate incoming light before it reaches the image sensor 127. The illumination source 131 can be configured to direct illumination towards the field of view of the imaging device 101, and can be any type of light source, for example LEDs, fluorescent bulbs, etc. In some embodiments, the illumination source 131 includes multiple different types of light sources which can be individually activated, for example infrared, ultraviolet, broadband, etc.

The computing device 105 includes several components similar to those in the imaging device 101. In the illustrated embodiment, the computing device 105 includes a processing component 133 that controls operation of the computing device 105 in accordance with computer-readable instructions stored in memory 135. The processing component 133 may be any logic processing unit, such as one or more central processing units (CPUs), graphics processing units (GPUs), digital signal processors (DSPs), application-specific integrated circuits (ASICs), etc. The processing component 133 may be a single processing unit or multiple processing units in an electronic device or distributed across multiple devices. The processing component 133 is connected to memory 135, which includes data storage that contains programs, software, and information, such as an operating system 137, application programs 139, and data 141. The operating system 137 can include, for example, Windows®, Linux®, Android™, iOS®, and/or an embedded real-time operating system. The application programs 139 and data 141 can include software and databases configured to control computing device 105 components, process and evaluate images received from the imaging device 101, communicate and exchange data and information with remote computers and other devices, etc.

The computing device 105 can include input components 143, such as a keyboard (with physical or virtual keys), a pointing device (such as a mouse, joystick, dial, or eye tracking device), a touchscreen, a microphone, and a camera for still photograph and/or video capture. The computing device 105 can also include various other input components 143 such as GPS or other location determination sensors, motion sensors, wearable input devices with accelerometers (e.g. wearable glove-type input devices), biometric sensors (e.g., fingerprint sensors), light sensors, card readers (e.g., magnetic stripe readers or memory card readers) and the like.

The processing component 133 can also be connected to one or more various output components 145, e.g., directly or via a hardware controller. The output devices can include a display such as an LCD, LED, or OLED display screen (such as a desktop computer screen, handheld device screen, or television screen), an e-ink display, a projected display (such as a heads-up display device), and/or a display integrated with a touchscreen that serves as an input device as well as an output device that provides graphical and textual visual feedback to the user. The output devices can also include a speaker for playing audio signals, haptic feedback devices for tactile output such as vibration, etc.

In the illustrated embodiment, computing device 105 further includes one or more communication components 147. The communication components can include, for example, a wireless transceiver 149 (e.g., one or more of a Wi-Fi transceiver; Bluetooth transceiver; near-field communication (NFC) device; wireless modem or cellular radio utilizing GSM, .CDMA, 3G and/or 4G technologies; etc.) and/or a wired network connector port 251 (e.g., one or more of an Ethernet port, cable modem, FireWire cable, Lightning connector, universal serial bus (USB) port, etc.). The communication components 147 are suitable for communication between the computing device 105 and other local and/or remote computing devices, e.g., the imaging device 101 via a wired or wireless peer-to-peer connection and/or indirectly via the communication link 109. For example, the wireless transceiver 149 of the computing device 105 can connect to the wireless transceiver 121 of imaging device 101, and/or the wired connector port 151 of the computing device 105 can connect to the wired connector port 123 of the imaging device 101. The computing device 105 further includes power 153, which can include battery power and/or facility power for operation of the various electrical components associated with the computing device 105.

Unless described otherwise, the construction and operation of the various components shown in FIG. 1 are of conventional design. As a result, such components need not be described in further detail herein, as they will be readily understood by those skilled in the relevant art. In other embodiments, the computing device 105 and the imaging device 101 include other features that may be different from those described above. In still further embodiments, the computing device 105 and/or the imaging device 101 include more or fewer features similar to those described above.

Kiosk Environment

Figure 4:
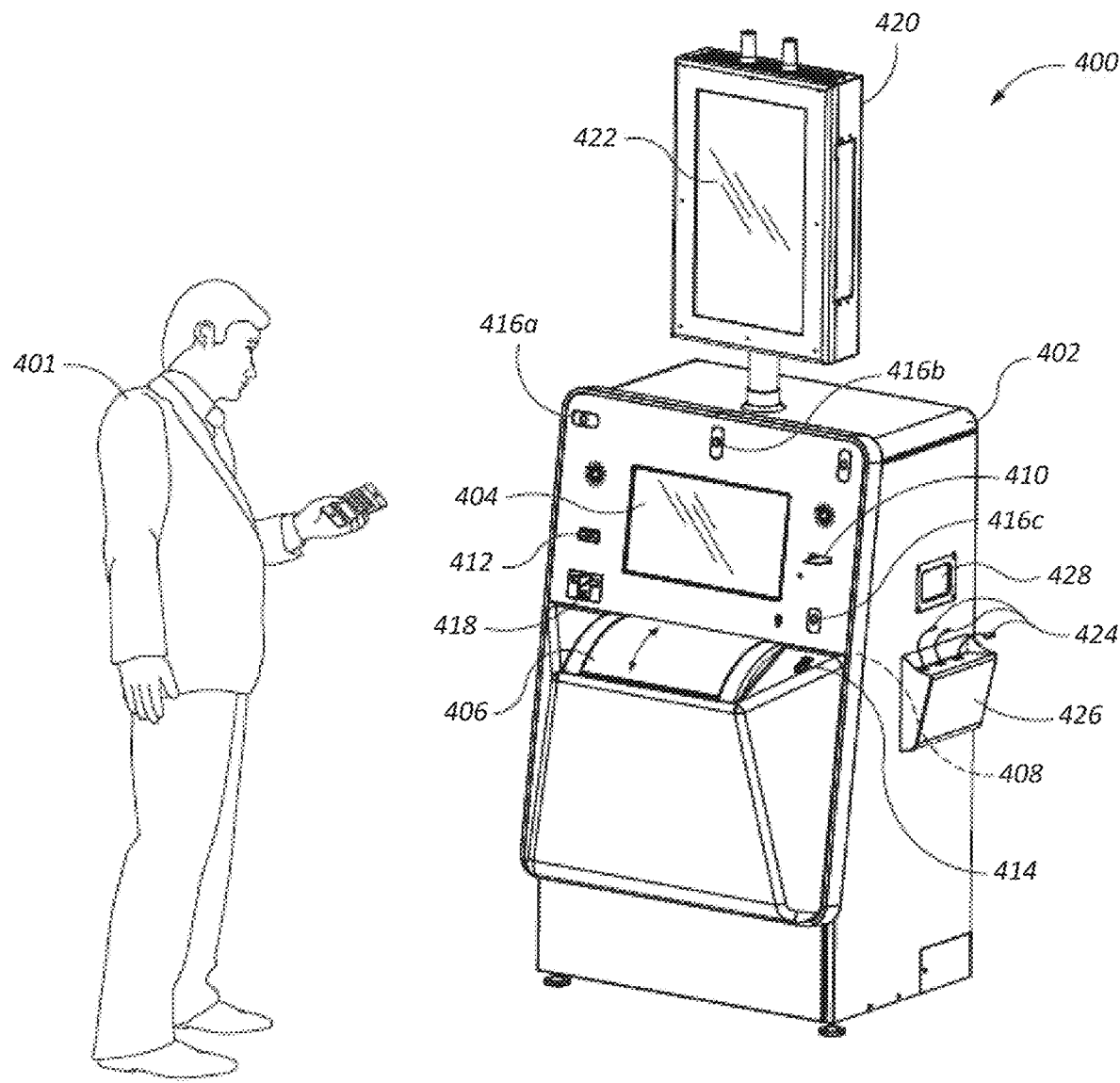
FIG. 4 is an isometric view of a machine employing methods and systems in accordance embodiments of the present technology for recycling mobile phones and/or other electronic devices.

In some embodiments, the routines described herein can be carried out using a kiosk that includes an imaging device (e.g., the imaging device 101) therein. In some embodiments, the kiosk can perform some or all of the functions performed by the computing device 105 described above, for example processing and evaluating images received from the imaging device 101. The kiosk can include, for example, a processing component (e.g., the computing device 105) and memory storing instructions that, when executed by the processing component, perform operations such as the routine 200 described above. FIG. 4, for example, is an isometric view of a kiosk 400 for recycling and/or other processing of mobile phones and other consumer electronic devices in accordance with the present technology. The term "processing" is used herein for ease of reference to generally refer to all manner of services and operations that may be performed or facilitated by the kiosk 400 on, with, or otherwise in relation to an electronic device. Such services and operations can include, for example, selling, reselling, recycling, donating, exchanging, identifying, evaluating, pricing, auctioning, decommissioning, transferring data from or to, reconfiguring, refurbishing, etc., mobile phones and other electronic devices. Although many embodiments of the present technology are described herein in the context of mobile phones, aspects of the present technology are not limited to mobile phones and generally apply to other consumer electronic devices. Such devices include, as non-limiting examples, all manner of mobile phones, smart phones, handheld devices, PDAs, MP3 players, tablet, notebook and laptop computers, e-readers, cameras, etc. In some embodiments, it is contemplated that the kiosk 400 can facilitate selling and/or otherwise processing larger consumer electronic devices, such as desktop computers, TVs, game consoles, etc., as well smaller electronic devices such as Google Glass™, smart-watches, etc.

In the illustrated embodiment, the kiosk 400 is a floor-standing self-service kiosk configured for use by a user 401 (e.g., a consumer, customer, etc.) to recycle, sell, and/or perform other operations with a mobile phone or other consumer electronic device. In other embodiments, the kiosk 400 can be configured for use on a countertop or a similar raised surface. Although the kiosk 400 is configured for use by consumers, in various embodiments the kiosk 400 and/or various portions thereof can also be used by other operators, such as a retail clerk or kiosk assistant to facilitate the selling or other processing of mobile phones and other electronic devices.

In the illustrated embodiment, the kiosk 400 includes a housing 402 that is approximately the size of a conventional vending machine. The housing 402 can be of conventional manufacture from, for example, sheet metal, plastic panels, etc. A plurality of user interface devices are provided on a front portion of the housing 402 for providing instructions and other information to users, and/or for receiving user inputs and other information from users. For example, the kiosk 400 can include a display screen 404 (e.g., a liquid crystal display ("LCD") or light emitting diode ("LED") display screen, a projected display (such as a heads-up display or a head-mounted device), and so on) for providing information, prompts, etc., to users. The display screen 404 can include a touch screen for receiving user input and responses to displayed prompts. In addition or alternatively, the kiosk 400 can include a separate keyboard or keypad for this purpose. The kiosk 400 can also include an ID reader or scanner 412 (e.g., a driver's license scanner), a fingerprint reader 414, and one or more cameras 416 (e.g., digital still and/or video cameras, identified individually as cameras 416a-c). The kiosk 400 can additionally include output devices such as a label printer having an outlet 410, and a cash dispenser having an outlet 418. Although not identified in FIG. 4, the kiosk 400 can further include a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), a receipt or voucher printer and dispenser, as well as other user input and output devices. The input devices can include a touchpad, pointing device such as a mouse, joystick, pen, game pad, motion sensor, scanner, eye direction monitoring system, etc. Additionally the kiosk 400 can also include a bar code reader, QR code reader, bag/package dispenser, a digital signature pad, etc. In the illustrated embodiment, the kiosk 400 additionally includes a header 420 having a display screen 422 for displaying marketing advertisements and/or other video or graphical information to attract users to the kiosk. In addition to the user interface devices described above, the front portion of the housing 402 also includes an access panel or door 406 located directly beneath the display screen 404. As described in greater detail below, the access door is configured to automatically retract so that the user 401 can place an electronic device (e.g., a mobile phone) in an inspection area 408 for automatic inspection by the kiosk 400.

A sidewall portion of the housing 402 can include a number of conveniences to help users recycle or otherwise process their mobile phones. For example, in the illustrated embodiment the kiosk 400 includes an accessory bin 428 that is configured to receive mobile device accessories that the user wishes to recycle or otherwise dispose of. Additionally, the kiosk 400 can provide a free charging station 426 with a plurality of electrical connectors 424 for charging a wide variety of mobile phones and other consumer electronic devices.

Figure 5B:
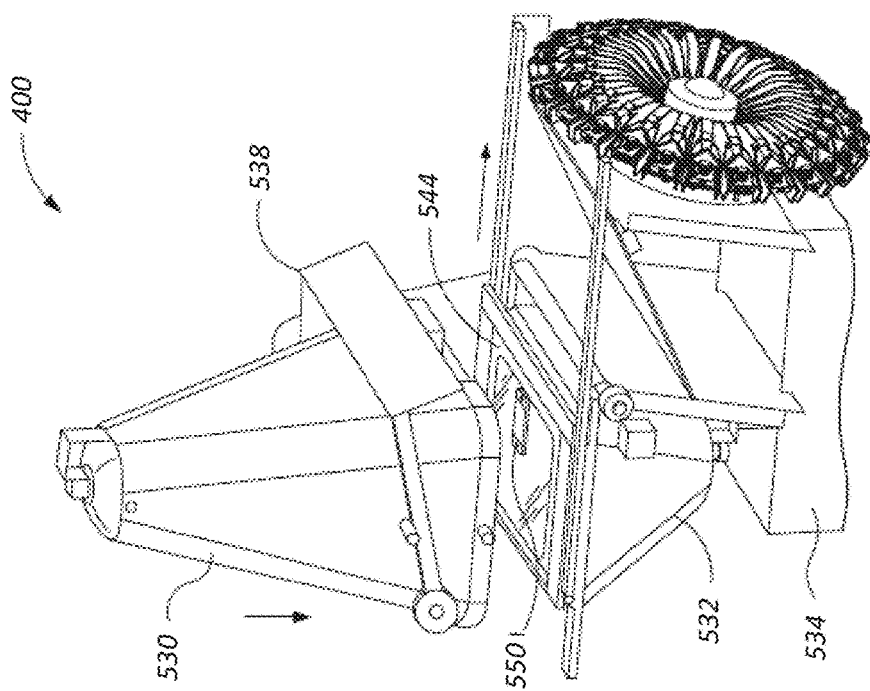
FIGS. 5A-5D are a series of isometric views of the machine of FIG. 4 with a number of exterior panels removed to illustrate operation of the machine in accordance with an embodiment of the present technology.
Figure 5A:
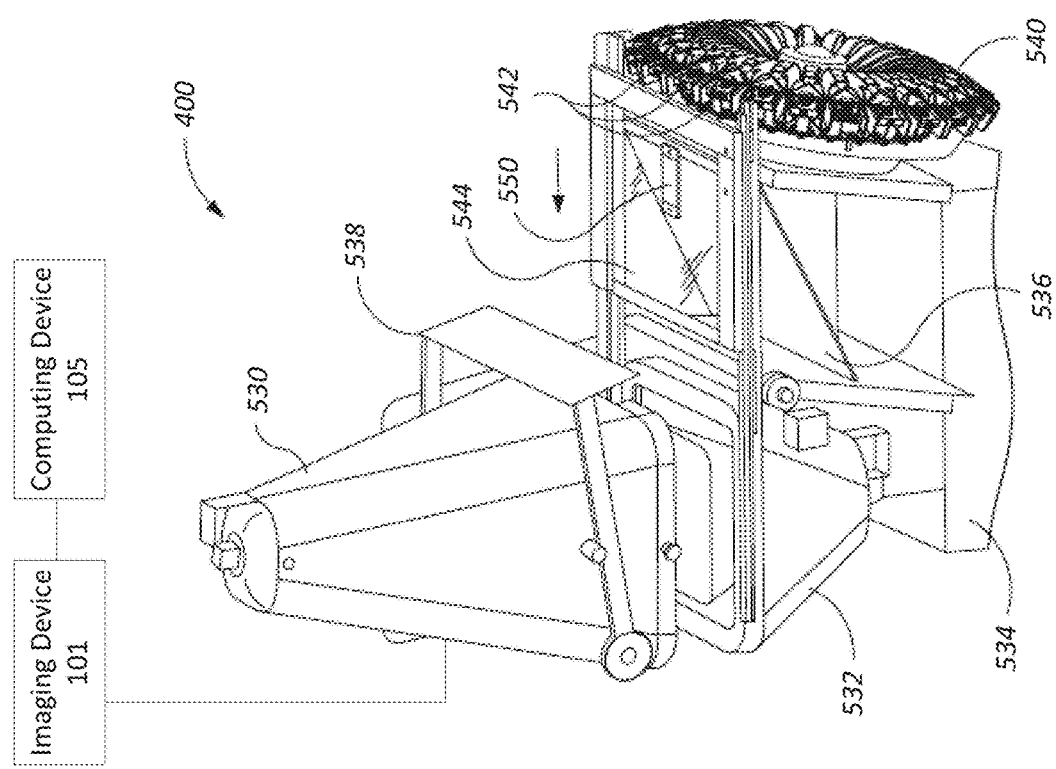

FIGS. 5A-5D are a series of isometric views of the kiosk 400 with the housing 402 removed to illustrate selected internal components configured in accordance with an embodiment of the present technology. Referring first to FIG. 5A, in the illustrated embodiment the kiosk 400 includes a connector carrier 540 and an inspection plate 544 operably disposed behind the access door 406 (FIG. 4). In the illustrated embodiment, the connector carrier 540 is a rotatable carrousel that is configured to rotate about a generally horizontal axis and carries a plurality of electrical connectors 542 (e.g., approximately 25 connectors) distributed around an outer periphery thereof. In other embodiments, other types of connector carrying devices (including both fixed and movable arrangements) can be used. In some embodiments, the connectors 542 includes a plurality of interchangeable USB connectors configured to provide power and/or exchange data with a variety of different mobile phones and/or other electronic devices. In operation, the connector carrier 540 is configured to automatically rotate about its axis to position an appropriate one of the connectors 542 adjacent to an electronic device, such as a mobile phone 550, that has been placed on the inspection plate 544 for recycling. The connector 542 can then be manually and/or automatically withdrawn from the connector carrier 540 and connected to a port on the mobile phone 550 for electrical analysis. Such analysis can include, e.g., an evaluation of the make, model, configuration, condition, etc.

In the illustrated embodiment, the inspection plate 544 is configured to translate back and forth (on, e.g., parallel mounting tracks) to move an electronic device, such as the mobile phone 550, between a first position directly behind the access door 406 and a second position between an upper chamber 530 and an opposing lower chamber 532. Moreover, in this embodiment the inspection plate 544 is transparent, or at least partially transparent (e.g., formed of glass, Plexiglas, etc.) to enable the mobile phone 550 to be photographed and/or otherwise optically evaluated from all, or at least most viewing angles (e.g., top, bottom, sides, etc.) using, e.g., one or more cameras, mirrors, etc. mounted to or otherwise associated with the upper and lower chambers 530 and 532. When the mobile phone 550 is in the second position, the upper chamber 530 can translate downwardly to generally enclose the mobile phone 550 between the upper chamber 530 and the lower chamber 532. The upper chamber 530 is operably coupled to a gate 538 that moves up and down in unison with the upper chamber 530.

In some embodiments, the kiosk 400 includes the imaging device 101 disposed within the upper hood 530. The imaging device 101 can be used as described above to facilitate visual inspection of the mobile phone 550 in order to evaluate the screen for cracks. The upper chamber 530 and/or the lower chamber 532 can also include one or more magnification tools, scanners (e.g., bar code scanners, infrared scanners, etc.) or other imaging components (not shown) and an arrangement of mirrors (also not shown) to view, photograph and/or otherwise visually evaluate the mobile phone 550 from multiple perspectives. In some embodiments, one or more of the cameras and/or other imaging components discussed above can be movable to facilitate device evaluation. For example, as noted above with respect to FIG. 1, the imaging device 101 can be affixed to a moveable mechanical component such as an arm, which in turn can be moved using a belt drive, rack and pinion system, or other suitable drive system coupled to an electronic controller (e.g., the computing device 105). The inspection area 408 can also include weight scales, heat detectors, UV readers/detectors, and the like, for further evaluation of electronic devices placed therein. The kiosk 400 can further include an angled binning plate 536 for directing electronic devices from the transparent plate 544 into a collection bin 534 positioned in a lower portion of the kiosk 400.

Figure 5D:
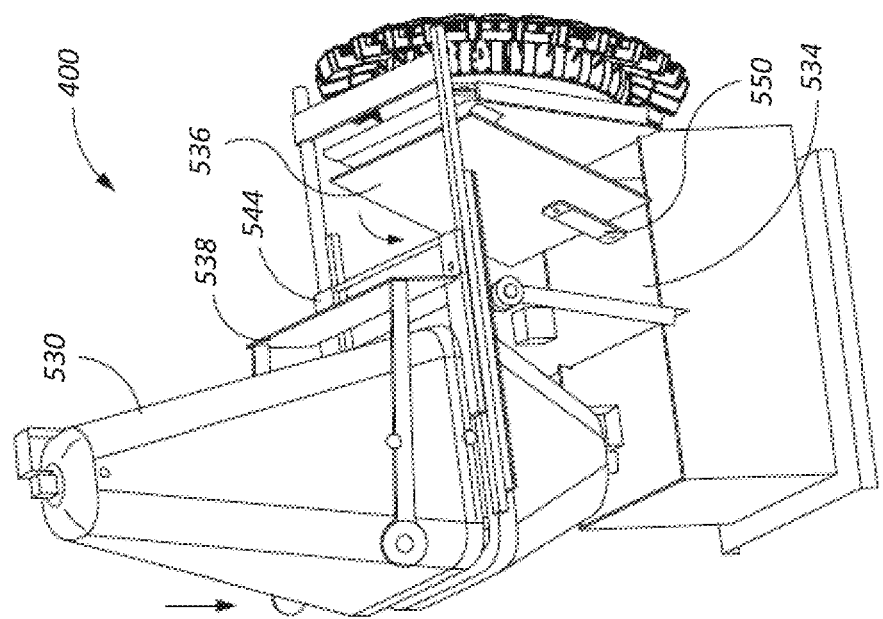

The kiosk 400 can be used in a number of different ways to efficiently facilitate the recycling, selling and/or other processing of mobile phones and other consumer electronic devices. Referring to FIGS. 4-5D together, in one embodiment a user wishing to sell a used mobile phone, such as the mobile phone 550, approaches the kiosk 400 and identifies the type of device the user wishes to sell in response to prompts on the display screen 404. Next, the user may be prompted to remove any cases, stickers, or other accessories from the device so that it can be accurately evaluated. Additionally, the kiosk 400 may print and dispense a unique identification label (e.g., a small adhesive-backed sticker with a quick response code ("QR code"), barcode, or other machine-readable indicia, etc.) from the label outlet 410 for the user to adhere to the back of the mobile phone 550. After this is done, the door 406 retracts and opens allowing the user to place the mobile phone 550 onto the transparent plate 544 in the inspection area 408 (FIG. 5A). The door 406 then closes and the transparent plate 544 moves the mobile phone 550 under the upper chamber 530 as shown in FIG. 5B. The upper chamber 530 then moves downwardly to generally enclose the mobile phone 550 between the upper and lower chambers 530 and 532, and the cameras and/or other imaging components in the upper and lower chambers 530 and 532 perform a visual inspection of the mobile phone 550. In one embodiment, the visual inspection of the mobile phone 550 includes performing the routine 200 (FIG. 2) to detect cracks in the screen. In some embodiments, the visual inspection includes a computer-implemented visual analysis (e.g., a three-dimensional ("3D") analysis) performed by a processing device within the kiosk (e.g., a CPU) to confirm the identification of the mobile phone 550 (e.g. make, model and/or sub-model) and/or to evaluate or assess the condition and/or function of the mobile phone 550 and/or its various components and systems. For example, the visual analysis can include computer-implemented evaluation (e.g., a digital comparison) of images of the mobile phone 550 taken from top, side and/or end view perspectives to determine length, width, and/or height (thickness) dimensions of the mobile phone 550. The visual analysis can further include a computer-implemented inspection of a display screen on the mobile phone 550 to check for, e.g., cracks in the glass and/or other damage or defects in the LCD (e.g., defective pixels, etc.).

Figure 5C:
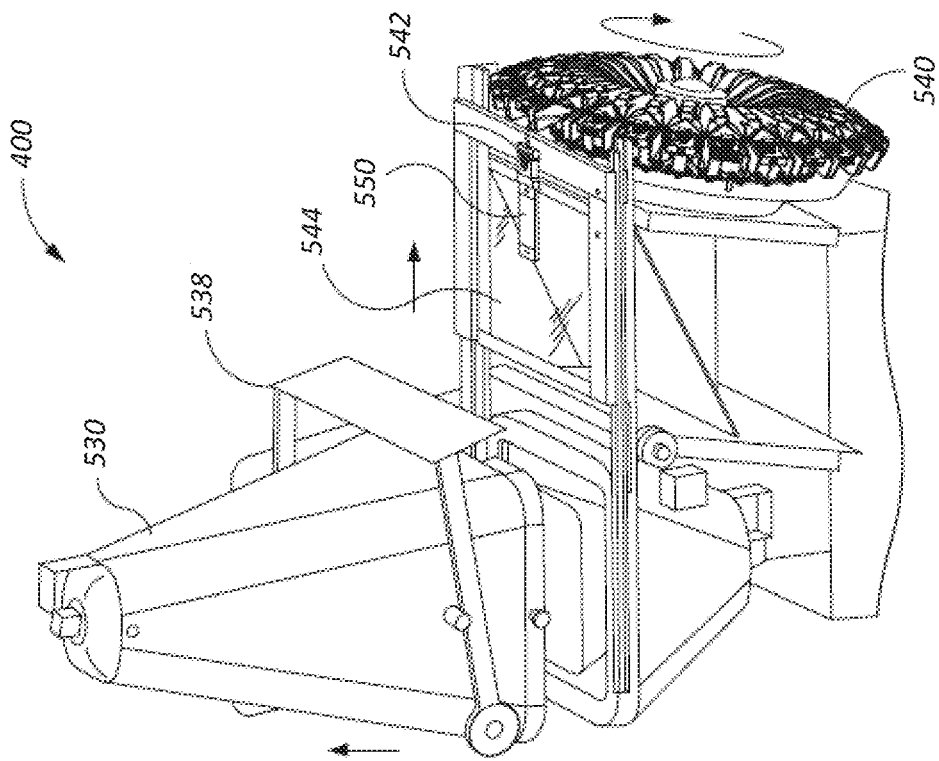

Referring next to FIG. 5C, after the visual analysis is performed and the device has been identified, the upper chamber 530 returns to its upper position and the transparent plate 544 returns the mobile phone 550 to its initial position near the door 406. The display screen 404 can also provide an estimated price, or an estimated range of prices, that the kiosk 400 may offer the user for the mobile phone 550 based on the visual analysis, and/or based on user input (e.g., input regarding the type, condition, etc. of the phone 550). If the user indicates (via, e.g., input via the touch screen) that they wish to proceed with the transaction, the connector carrier 540 automatically rotates an appropriate one of the connectors 542 into position adjacent the transparent plate 544, and door 406 is again opened. The user can then be instructed (via, e.g., the display screen 404) to withdraw the selected connector 542 (and its associated wire) from the carrousel 540, plug the connector 542 into the corresponding port (e.g., a USB port) on the mobile phone 550, and reposition the mobile phone 550 in the inspection area on the transparent plate 544. After doing so, the door 406 once again closes and the kiosk 400 (e.g. the kiosk CPU) performs an electrical inspection of the device via the connector 542 to further evaluate the condition of the phone as well as specific component and operating parameters such as the memory, carrier, etc. In addition or alternatively, in some embodiments the electrical inspection can include a determination of phone manufacturer information (e.g., a vendor identification number or VID) and product information (e.g., a product identification number or PID). In some embodiments, the kiosk 400 can perform the electrical analysis using one or more of the methods and/or systems described in detail in the commonly owned patents and patent applications identified herein and incorporated by reference in their entireties.

After the visual and electronic analysis of the mobile phone 550, the user is presented with a phone purchase price via the display screen 404. If the user declines the price (via, e.g., the touch screen), a retraction mechanism (not shown) automatically disconnects the connector 542 from the mobile phone 550, the door 406 opens, and the user can reach in and retrieve the mobile phone 550. If the user accepts the price, the door 406 remains closed and the user may be prompted to place his or her identification (e.g., a driver's license) in the ID scanner 412 and provide a thumbprint via the fingerprint, reader 414. As a fraud prevention measure, the kiosk 400 can be configured to transmit an image of the driver's license to a remote computer screen, and an operator at the remote computer can visually compare the picture (and/or other information) on the driver's license to an image of the person standing in front of the kiosk 400 as viewed by one or more of the cameras 416a-c (FIG. 4) to confirm that the person attempting to sell the phone 550 is in fact the person identified by the driver's license. In some embodiments, one or more of the cameras 416a-c can be movable to facilitate viewing of kiosk users, as well as other individuals in the proximity of the kiosk 400. Additionally, the person's fingerprint can be checked against records of known fraud perpetrators. If either of these checks indicate that the person selling the phone presents a fraud risk, the transaction can be declined and the mobile phone 550 returned. After the user's identity has been verified, the transparent plate 544 moves back toward the upper and lower chambers 530 and 532. As shown in FIG. 5D, however, when the upper chamber 530 is in the lower position the gate 538 permits the transparent plate 544 to slide underneath but not electronic devices carried thereon. As a result, the gate 538 knocks the mobile phone 550 off of the transparent plate 544, onto the binning plate 536 and into the bin 534. The kiosk can then provide payment of the purchase price to the user. In some embodiments, payment can be made in the form of cash dispensed from the cash outlet 418. In other embodiments, the user can receive remuneration for the mobile phone 550 in various other useful ways. For example, the user can be paid via a redeemable cash voucher, a coupon, an e-certificate, a prepaid card, a wired or wireless monetary deposit to an electronic account (e.g., a bank account, credit account, loyalty account, online commerce account, mobile wallet etc.), Bitcoin, etc.

As those of ordinary skill in the art will appreciate, the foregoing routines are but some examples of ways in which the kiosk 400 can be used to recycle or otherwise process consumer electronic devices such as mobile phones. Although the foregoing example is described in the context of mobile phones, it should be understood that the kiosk 400 and various embodiments thereof can also be used in a similar manner for recycling virtually any consumer electronic device, such as MP3 players, tablet computers, PDAs, and other portable devices, as well as other relatively non-portable electronic devices such as desktop computers, printers, devices for implementing games, entertainment or other digital media on CDs, DVDs, Blu-ray, etc. Moreover, although the foregoing example is described in the context of use by a consumer, the kiosk 400 in various embodiments thereof can similarly be used by others, such as a store clerk, to assist consumers in recycling, selling, exchanging, etc. their electronic devices.

The disclosed technology also includes the disclosures of U.S. patent application Ser. No. 14/498,763, titled "METHODS AND SYSTEMS FOR PRICING AND PERFORMING OTHER PROCESSES ASSOCIATED WITH RECYCLING MOBILE PHONES AND OTHER ELECTRONIC DEVICES," filed by the applicant on Sep. 26, 2014; U.S. patent application Ser. No. 14/500,739, titled "MAINTAINING SETS OF CABLE COMPONENTS USED FOR WIRED ANALYSIS, CHARGING, OR OTHER INTERACTION WITH PORTABLE ELECTRONIC DEVICES," filed by the applicant on Sep. 29, 2014; U.S. patent application Ser. No. 14/873,158, titled "WIRELESS-ENABLED KIOSK FOR RECYCLING CONSUMER DEVICES," filed by the applicant on Oct. 1, 2015; U.S. patent application Ser. No. 14/873,145, titled "APPLICATION FOR DEVICE EVALUATION AND OTHER PROCESSES ASSOCIATED WITH DEVICE RECYCLING," filed by the applicant on Oct. 1, 2015; U.S. patent application Ser. No. 14/506,449, titled "SYSTEM FOR ELECTRICALLY TESTING MOBILE DEVICES AT A CONSUMER-OPERATED KIOSK, AND ASSOCIATED DEVICES AND METHODS," filed by the applicant on Oct. 3, 2014; U.S. patent application Ser. No. 14/925,357, titled "SYSTEMS AND METHODS FOR RECYCLING CONSUMER ELECTRONIC DEVICES," filed by the applicant on Oct. 28, 2015; U.S. patent application Ser. No. 14/925,375, titled "METHODS AND SYSTEMS FOR FACILITATING PROCESSES ASSOCIATED WITH INSURANCE SERVICES AND/OR OTHER SERVICES FOR ELECTRONIC DEVICES," filed by the applicant on Oct. 28, 2015; U.S. patent application Ser. No. 14/964,963, titled "METHODS AND SYSTEMS FOR PROVIDING INFORMATION REGARDING COUPONS/PROMOTIONS AT KIOSKS FOR RECYCLING MOBILE PHONES AND OTHER ELECTRONIC DEVICES," filed by the applicant on Dec. 10, 2015; U.S. patent application Ser. No. 14/568,051, titled "METHODS AND SYSTEMS FOR IDENTIFYING MOBILE PHONES AND OTHER ELECTRONIC DEVICES," filed by the applicant on Dec. 11, 2014; U.S. patent application Ser. No. 14/966,346, titled "SYSTEMS AND METHODS FOR RECYCLING CONSUMER ELECTRONIC DEVICES," filed by the applicant on Dec. 11, 2015; U.S. patent application Ser. No. 14/598,469, titled "METHODS AND SYSTEMS FOR DYNAMIC PRICING AND PERFORMING OTHER PROCESSES ASSOCIATED WITH RECYCLING MOBILE PHONES AND OTHER ELECTRONIC DEVICES," filed by the applicant on Jan. 16, 2015; U.S. patent application Ser. No. 14/660,768, titled "SYSTEMS AND METHODS FOR INSPECTING MOBILE DEVICES AND OTHER CONSUMER ELECTRONIC DEVICES WITH A LASER," filed by the applicant on Mar. 17, 2015; U.S. patent application Ser. No. 14/663,331, titled "DEVICE RECYCLING SYSTEMS WITH FACIAL RECOGNITION," filed by the applicant on Mar. 19, 2015; U.S. provisional application No. 62/169,072, titled "METHODS AND SYSTEMS FOR VISUALLY EVALUATING ELECTRONIC DEVICES," filed by the applicant on Jun. 1, 2015; U.S. provisional application No. 62/202,330, titled "METHODS AND SYSTEMS FOR INSPECTING MOBILE DEVICES AND OTHER CONSUMER ELECTRONIC DEVICES WITH ROBOTIC ACTUATION," filed by the applicant on Aug. 7, 2015; U.S. patent application Ser. No. 15/057,707, titled "METHODS AND SYSTEMS FOR RECORDING INTERACTIONS WITH A SYSTEM FOR PURCHASING MOBILE PHONES AND OTHER ELECTRONIC DEVICES," filed by the applicant on Mar. 1, 2016; U.S. patent application Ser. No. 14/873,158, titled "WIRELESS-ENABLED KIOSK FOR RECYCLING CONSUMER DEVICES," filed by the applicant on Oct. 1, 2015; U.S. patent application Ser. No. 14/873,145, titled "APPLICATION FOR DEVICE EVALUATION AND OTHER PROCESSES ASSOCIATED WITH DEVICE RECYCLING," filed by the applicant on Oct. 1, 2015; U.S. patent application Ser. No. 14/925,357, titled "SYSTEMS AND METHODS FOR RECYCLING CONSUMER ELECTRONIC DEVICES," filed by the applicant on Oct. 28, 2015; U.S. patent application Ser. No. 14/925,375, titled "METHODS AND SYSTEMS FOR FACILITATING PROCESSES ASSOCIATED WITH INSURANCE SERVICES AND/OR OTHER SERVICES FOR ELECTRONIC DEVICES," filed by the applicant on Oct. 28, 2015; U.S. patent application Ser. No. 14/934,134, titled "METHODS AND SYSTEMS FOR EVALUATING AND RECYCLING ELECTRONIC DEVICES,"; and U.S. patent application Ser. No. 14/967,183, titled "SYSTEMS AND METHODS FOR RECYCLING CONSUMER ELECTRONIC DEVICES," filed Dec. 11, 2015; U.S. patent application Ser. No. 15/130,851, titled "METHODS AND SYSTEMS FOR DETECTING CRACKS IN ELECTRONIC DEVICES," filed Apr. 15, 2016; U.S. patent application Ser. No. 15/176,975 titled "METHODS AND SYSTEMS FOR DETECTING SCREEN COVERS ON ELECTRONIC DEVICES," filed Jun. 8, 2016; and U.S. patent application No. 62/332,736, titled "METHODS AND SYSTEMS FOR DETECTING DAMAGE IN EDGE REGIONS OF MOBILE ELECTRONIC DEVICES," filed May 6, 2016 each of which is incorporated herein by reference in its entirety. All of the patents and patent applications listed above are commonly owned by the applicant of the present application, and they along with any other patents or patent applications identified herein are incorporated herein by reference in their entireties.

While the Internet is shown, a private network, such as an intranet may likewise be used herein. The network may have a client-server architecture, in which a computer is dedicated to serving other client computers, or it may have other architectures such as peer-to-peer, in which one or more computers serve simultaneously as servers and clients. A database or databases, coupled to the server computer(s), stores much of the web pages and content exchanged between the user computers. The server computer(s), including the database(s), may employ security measures to inhibit malicious attacks on the system and preserve the integrity of the messages and data stored therein (e.g., firewall systems, message encryption and/or authentication (e.g., using transport layer security (TLS) or secure socket layers (SSL)), password protection schemes, encryption of stored data (e.g., using trusted computing hardware), and the like).

One skilled in the relevant art will appreciate that the concepts of the invention can be used in various environments other than location based or the Internet. In general, a display description may be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, may be used instead of the Internet. The system may be conducted within a single computer environment, rather than a client/server environment. Also, the user computers may comprise any combination of hardware or software that interacts with the server computer, such as television-based systems and various other consumer products through which commercial or noncommercial transactions can be conducted. The various aspects of the invention described herein can be implemented in or for any e-mail environment.

Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein, and refer to any of the above devices and systems, as well as any data processor. Input devices may include a touchpad, keyboard and/or a pointing device such as a mouse. Other input devices are possible such as a microphone, joystick, pen, game pad, scanner, digital camera, video camera, and the like. The data storage devices may include any type of computer-readable media that can store data accessible by a computer, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to a network such as a local area network (LAN), wide area network (WAN) or the Internet.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. The data storage devices may include any type of computer-readable media that can store data accessible by a computer, such as magnetic hard and floppy disk drives, optical disk drives, magnetic cassettes, tape drives, flash memory cards, DVDs, Bernoulli cartridges, RAM, ROMs, smart cards, etc. Indeed, any medium for storing or transmitting computer-readable instructions and data may be employed, including a connection port to a network such as a LAN, WAN, or the Internet. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). The terms "memory" and "computer-readable storage medium" include any combination of temporary, persistent, and/or permanent storage, e.g., ROM, writable memory such as RAM, writable non-volatile memory such as flash memory, hard drives, solid state drives, removable media, and so forth, but do not include a propagating signal per se.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like, are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples—alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims. Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method performed by one or more computing devices for detecting cracks in a screen of an electronic device, the method comprising:
    overlaying at least one kernel on an image of the screen of the electronic device at a first selected location, the kernel comprising a matrix having a line region and a non-line region;
    determining a first average brightness value for the line region and a second average brightness value for the non-line region at the first selected location;
    automatically identifying a crack at the first selected location if the first average brightness value is greater than the second average brightness value by at least a predetermined threshold amount;
    overlaying the at least one kernel on the image of the screen of the electronic device at a second selected location;
    determining a third average brightness value for the line region and a fourth average brightness value for the non-line region at the second selected location; and
    automatically identifying a crack at the second selected location if the third average brightness value is greater than the fourth average brightness value by at least the predetermined threshold amount.

2. The method of claim 1, further comprising:
    at the first location, generating an image pyramid with multiple layers of the image, each of the layers being down sampled to a different degree; and
    for each of the layers, overlaying the kernel on the layer to obtain, at various locations of the layer, average brightness values for each of the line region and the non-line region.

3. The method of claim 1 wherein the at least one kernel includes at least a first kernel and a second kernel, wherein the line region in the first kernel has a first orientation, and wherein the line region in the second kernel has a second orientation different from the first orientation.

4. The method of claim 1 wherein the line region comprises a first line region portion and and a second line region portion, and wherein the method further comprises:
    at the first location, determining brightness values for each of the first line region portion and the second line region portion, wherein the first average brightness value for the line region is an average of the brightness value for the first line region portion and the brightness value for second line region portion.

5. The method of claim 1 wherein the the non-line region comprises a first non-line region portion and a second non-line region portion, and wherein the method further comprises:
    at the first location, determining brightness values for each of the first non-line region portion and the second non-line region portion, wherein the second average brightness value for the non-line region is an average of the brightness value for the first non-line region portion and the brightness value for the second non-line region portion.

6. The method of claim 1 wherein the the non-line region comprises a first non-line region portion positioned on a first side of the line region and a second non-line region portion positioned on a second side of the line region opposite the first side.

7. The method of claim 1 wherein the image of the screen is a processed image, and wherein the method further comprises:
    forming the processed image, wherein forming the processed image includes:
        obtaining a lighted image of the screen;
        obtaining a non-lighted image of the screen; and
        subtracting the lighted image from the non-lighted image.

8. A method performed by one or more computing devices for detecting cracks in a screen of an electronic device, the method comprising:
    overlaying at least one kernel on an image of the screen of the electronic device at a selected location, the kernel comprising a matrix having a line region and a non-line region, wherein the line region comprises a first line region portion and a second line region portion;

determining brightness values for each of the first line region portion and the second line region portion;

determining a first average brightness value for the line region and a second average brightness value for the non-line region, wherein the first average brightness value for the line region is an average of the brightness value for the first line region portion and the brightness value for second line region portion;

automatically identifying a crack at the selected location if the first average brightness value is greater than the second average brightness value by at least a predetermined threshold amount; and performing a secondary check on the identified crack to detect a false-positive crack identification.

9. The method of claim 8, wherein the secondary check includes determining whether at least one of the following conditions is satisfied:
(a) a brightness value of a first non-line region portion and a brightness value of a second non-line region portion are within a predetermined range of one another;
(b) the brightness value of the first non-line region portion or the brightness value of the second non-line region portion is below a predetermined threshold level;
(c) the first average brightness value of the line region is greater than the second average brightness value of the non-line region by a predetermined threshold amount;
(d) any brightness value in the first line region portion, the second line region portion, the first non-line region portion, or the second non-line region portion is greater than a predetermined threshold value;
(e) any brightness value in the first line region portion, the second line region portion, the first non-line region portion, or the second non-line region portion is lower than a predetermined threshold value; and
(f) any three consecutive brightness values in the line region do not increase or decrease monotonically,
wherein, if any of conditions (a)-(f) are satisfied, then the identified crack is discarded.

10. The method of claim 1 wherein the at least one kernel is a plurality of kernels, and wherein if a crack is identified at the first selected location for any one of the plurality of kernels, any remaining kernels in the plurality of kernels are not overlayed on the image of the screen of the electronic device at the first selected location.

11. A computing system for detecting a crack in an illuminated screen of a mobile phone, the computing system comprising:
one or more processors for executing computer-executable instructions; and
a non-transitory computer-readable storage medium storing computer-executable instructions for execution by the one or more processors, wherein execution of the computer-executable instructions cause the one or more processors to:
obtain an image of the illuminated screen of the mobile phone;
overlay at least one kernel on a screen region of the image at a selected location of the image, the kernel comprising a matrix having a first region and a second region;
determine a first average brightness value for the first region and a second average brightness value for the second region; and
automatically identify a crack at the selected location if the first average brightness value is greater than the second average brightness value by at least a predetermined threshold amount.

12. The computing system of claim 11 wherein execution of the computer-executable instructions further cause the processor to:
generating multiple copies of the image, each of the copies being down sampled to a different degree; and
for each of the copies, overlay the at least one kernel on the copy to obtain the first average brightness value and the second average brightness value for the first and second regions.

13. The computing system of claim 11 wherein execution of the computer-executable instructions further cause the processor to:
before overlaying the at least one kernel on the screen region, identify cracks in the mobile phone outside of the screen region of the image, wherein, if one or more cracks outside of the screen region are identified, the mobile phone is identified as damaged.

14. The computing system of claim 13 wherein checking for cracks on the mobile phone outside of the screen region of the image includes using at least one of a Canny edge detector and a Hough transform.

15. The computing system of claim 11 wherein execution of the computer-executable instructions further cause the processor to perform a secondary inspection of the identified crack to detect a false-positive crack identification.

16. The computing system of claim 11 wherein the at least one kernel is a plurality of kernels, and wherein if a crack is identified at the selected location for any one of the plurality of kernels the computer-executable instructions further control the one or more computing systems to not overlay any additional kernels on the screen region of the image at the selected location.

17. The computing system of claim 11 wherein the image is a processed image, and wherein execution of the computer-executable instructions further cause the processor to:
generate the processed image, wherein generating the processed image includes:
obtaining a lighted image of the screen;
obtaining a non-lighted image of the screen; and
subtracting the lighted image from the non-lighted image.

18. A computing system for detecting a crack in a screen of an electronic device, the computing system comprising:
one or more processors for executing computer-executable instructions; and
a non-transitory computer-readable storage medium storing computer-executable instructions for execution by the one or more processors, wherein execution of the computer-executable instructions cause the one or more processors to:
obtain an image of the electronic device;
overlay at least one kernel on a screen region of the image at a selected location of the image, the kernel comprising a matrix having a first region and a second region;
determine a first average brightness value for the first region and a second average brightness value for the second region, wherein the second region comprises a first portion positioned on a first side of the first region and a second portion positioned on a second side of the first region opposite the first side; and
automatically identify a crack at the selected location if the first average brightness value is greater than the second average brightness value by at least a predetermined threshold amount.

19. The computing system of claim 18 wherein execution of the computer-executable instructions further cause the one or more processors to perform a secondary inspection of the identified crack to detect a false-positive crack identification.

\* \* \* \* \*

UNITED STATES PATENT AND TRADEMARK OFFICE
CERTIFICATE OF CORRECTION

| | | |
|---|---|---|
| PATENT NO. | : 11,803,954 B2 | Page 1 of 1 |
| APPLICATION NO. | : 17/137261 | |
| DATED | : October 31, 2023 | |
| INVENTOR(S) | : Babak Forutanpour et al. | |

It is certified that error appears in the above-identified patent and that said Letters Patent is hereby corrected as shown below:

On the Title Page

In page 6, Column 2 item (56) (Other Publications), Line 6, delete "recycling"" and insert -- recycling," -- therefor.

In the Specification

In Column 6, Line 49, delete "140)." and insert -- 140. -- therefor.

In Column 7, Line 1, delete "moreso" and insert -- more so -- therefor.

In Column 11, Line 65, delete ".CDMA," and insert -- CDMA -- therefor.

In the Claims

In Column 22, Line 27, in Claim 4, delete "and and" and insert -- and -- therefor.

In Column 22, Line 35, in Claim 5, delete "the the" and insert -- the -- therefor.

In Column 22, Line 46, in Claim 6, delete "the the" and insert -- the -- therefor.

Signed and Sealed this
Twenty-fifth Day of March, 2025

Coke Morgan Stewart
*Acting Director of the United States Patent and Trademark Office*